(12) United States Patent
Vallauri et al.

(10) Patent No.: US 7,645,408 B2
(45) Date of Patent: Jan. 12, 2010

(54) PROCESS FOR MANUFACTURING THE ELASTOMERIC SLEEVE OF A JOINT FOR ELECTRICAL CABLES AND MANUFACTURING APPARATUS THEREOF

(75) Inventors: Ubaldo Vallauri, Monza (IT); Francesco Portas, Quattordio (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 453 days.

(21) Appl. No.: 10/532,537

(22) PCT Filed: Oct. 30, 2002

(86) PCT No.: PCT/EP02/12094

§ 371 (c)(1),
(2), (4) Date: Jul. 7, 2006

(87) PCT Pub. No.: WO2004/040730

PCT Pub. Date: May 13, 2004

(65) Prior Publication Data

US 2006/0272842 A1 Dec. 7, 2006

(51) Int. Cl.
*B29C 45/14* (2006.01)
*H02G 5/06* (2006.01)
(52) U.S. Cl. .............. 264/272.15; 264/259; 264/271.1; 264/272.11; 264/272.13; 264/272.14; 156/47; 156/48; 156/49; 156/51; 156/52; 174/21 R; 174/DIG. 33; 277/608
(58) Field of Classification Search ............ 264/272.15, 264/272.13, 262, 313, 317, 272.11, 271.1, 264/272.14; 156/49, 52
See application file for complete search history.

(56) References Cited

U.S. PATENT DOCUMENTS 3,352,962 A * 11/1967 Brown et al. ............... 174/73.1

(Continued)

FOREIGN PATENT DOCUMENTS

EP 0 199 742 B1 11/1986

(Continued)

OTHER PUBLICATIONS

Giles, H. F., Wagner, J.R., and Mount, E.M., Extrusion—The Definitive Processing Guide and Handbook, William Andrew Publishing/Plastics Design Library, 2005, pp. 469-474.*

(Continued)

*Primary Examiner*—Richard Crispino
*Assistant Examiner*—William P Bell
(74) *Attorney, Agent, or Firm*—Finnegan, Henderson, Farabow, Garrett & Dunner, L.L.P.

(57) ABSTRACT

A process for manufacturing an elastomeric sleeve of a joint for electrical cables. The sleeve has an electric field-control element, an electrical insulating element surrounding the electric field-control element, and at least a semiconductive element having two stress control screens. The process includes providing the electric field-control element and the two stress control screens on a supporting element; introducing the supporting element into a mold provided for molding the electrical insulating element; filling with the electrical insulating material the space radially external to the electric field-control element and the stress control screens, the step of filling being carried out during the step of introducing; curing the electrical insulating material to obtain the electrical insulating element of the elastomeric sleeve. An apparatus for carrying out the process for manufacturing is also disclosed.

19 Claims, 23 Drawing Sheets

U.S. PATENT DOCUMENTS

| | | | |
|---|---|---|---|
| 3,846,578 | A | 11/1974 | Bahder et al. |
| 4,241,004 | A | 12/1980 | Hervig |
| 4,377,547 | A | 3/1983 | Hervig |
| 4,383,131 | A * | 5/1983 | Clabburn .................. 174/73.1 |
| 5,283,392 | A * | 2/1994 | Ooshima et al. .......... 174/84 R |
| 2002/0070475 | A1 | 6/2002 | Schneider, III et al. |

FOREIGN PATENT DOCUMENTS

| | | |
|---|---|---|
| EP | 0 379 056 B1 | 7/1990 |
| EP | 0 393 495 B1 | 10/1990 |
| EP | 0 415 082 B1 | 3/1991 |
| EP | 0 422 567 A2 | 4/1991 |
| EP | 0 541 000 B1 | 5/1993 |
| EP | 0 547 656 B1 | 6/1993 |
| EP | 0 547 667 B1 | 6/1993 |
| EP | 0 735 639 B1 | 10/1996 |
| JP | 05022822 A * | 1/1993 |
| JP | 5-292624 | 11/1993 |

OTHER PUBLICATIONS

Merriam-Webster OnLine Dictionary (www.merriam-webster.com).*

Mitsubishi Cable; "Mfg. Method and Appts. for Reinforced Insulating Member—Comprising Fixing Processing Support to Cylindrical Block Member After Removing From Metallic Mould"; Derwent Abstract JP 10224937, Aug. 21, 1998.

Fujiwara et al.; "Method for Forming Insulation Cable Connecting Part"; Patent Abstracts of Japan of JP 03-280374, Dec. 11, 1991.

Ikeda et al.; "Manufacture of Extrusion Molded Joint for CV Cable"; Patent Abstracts of Japan of JP 03-167773, Jul. 19, 1991.

Ohata et al.; "Method of Forming Power Cable Joined Section Insulated With Rubber or Plastics"; Patent Abstract of Japan of JP 58-059030, Apr. 7, 1983.

Ohata et al.; "Manufacture of Power Cable Joined Section Insulated With Rubber or Plastics"; Patent Abstracts of Japan of JP 58-059029, Apr. 7, 1983.

Ohata et al.; "Manufacture of Joined Section of Cable Insulated With Crosslinked Polyethylene"; Patent Abstracts of Japan of JP 58-059027, Apr. 7, 1983.

Mikami et al.; "Extrusion Mold Joint Method and Metal Dies Therein"; Patent Abstracts of Japan of JP 05-280115, Oct. 22, 1996.

Tadmor et al.; "Principles of Polymer Processing"; John Wiley & Sons, p. 594, (1979).

Chang et al.; "Mold-Flow-Induced Anisotropy in Nitrile Rubber"; Rubber Chemistry and Technology, vol. 54, p. 448, (1980).

* cited by examiner

PROCESS FOR MANUFACTURING THE ELASTOMERIC SLEEVE OF A JOINT FOR ELECTRICAL CABLES AND MANUFACTURING APPARATUS THEREOF

CROSS REFERENCE TO RELATED APPLICATION

This application is a national phase application based on PCT/EP2002/012094, filed Oct. 30, 2002, the content of which is incorporated herein by reference.

BACKGROUND OF THE INVENTION

1. Field of the Invention

The present invention relates to a process for manufacturing the elastomeric sleeve of a joint for electrical cables.

In particular, the present invention relates to a process for manufacturing the extruded insulating element of the elastomeric sleeve of a joint for extruded electrical (power) cables.

Furthermore, the present invention relates to an apparatus for manufacturing the elastomeric sleeve of a joint for electrical cables, said sleeve comprising an extruded insulating element.

In particular, the present invention relates to an apparatus for manufacturing the extruded insulating element of said elastomeric sleeve.

2. Description of the Related Art

Generally cables for conveying or supplying energy, in particular for conveying or supplying medium-voltage or high-voltage energy, comprise, from the inside towards the outside of the cable: a metal conductor, an inner semiconductive layer, an electrical insulating layer, an outer semiconductive layer, a metal screen (usually made of aluminium, lead or copper) and an external polymeric sheath. The predetermined sequence: metal conductor, inner semiconductive layer, insulating layer and outer semiconductive layer is generally known with the term of "cable core".

In order to join two electrical cables, for example of the single-core type, over a portion of defined length, the ends of both the electrical cables are stripped so as to expose the constitutive elements thereof in a staggered way.

In the case the joining operation is performed between two electrical cables of the multi-core type, for example double-core or triple-core type, the procedure described hitherto is repeated for each single phase of each cable.

Subsequently to said step of stripping, the joining operation comprises the steps of forming an electrical connection between the cables conductors disposed end-to-end and of providing an elastomeric sleeve to be fitted upon and tightened over the joined ends of said cables.

Preferably, the electrical connection is formed by welding or by using a compression clamp or the like.

Generally, said elastomeric sleeve has a form which is substantially cylindrical in its central portion and of frusto-conical shape at its ends so as to provide an optimum mechanical connection between the joined cables and the sleeve itself.

The elastomeric sleeve comprises a plurality of radially superimposed elements intended to restore the electrical and mechanical connection between exposed layers of a first cable section and corresponding exposed layers of a second cable section.

Starting from its innermost portion, said elastomeric sleeve generally comprises:

an electric field-control element which is generally known with the term of "electrode";

an electrical insulating element which surrounds said electrode, and at least one semiconductive element which is positioned radially external to said electrical insulating element.

The electrode is a voltage distribution element which is positioned, generally as a tubular shield, in correspondence of the joined ends of the cables and partially covers the insulating layers thereof. The electrode is generally made of a semiconductive material and creates a sort of Faraday cage at constant potential to annul the effects due to shape irregularities of the electrode.

The semiconductive element of the elastomeric sleeve has the function of connecting the outer semiconductive layers of the cables so that the continuity of the outer semiconductive layers of said first and second sections of said cables can be restored.

Generally, the semiconductive element comprises two cup-shaped stress control screens, which are positioned at the axial ends of said electrical insulating element, and an insulation screen, which surrounds the electrical insulating element and is positioned between said stress control screens.

Generally, the elastomeric sleeve is manufactured separately and supplied fitted, in an elastically-dilated condition, on a hollow tubular support made of rigid plastic which is successively removed so that the sleeve elastically contracts and grips the cable sections in the joining zone.

This support may be obtained, for example, from a strip-like element helically wound to form a plurality of adjacent spirals fastened together so that, when a pulling force is exerted on a free end portion of said strip-like element, the tubular support is able to collapse, due to gradual separation of the spirals, and to allow the correct positioning of the sleeve. This sleeve is of the cold-retractable type. Embodiments of said supports are described, for example, in the documents EP-541,000; EP-735,639; EP-547,656; EP-547,667 in the name of the Applicant.

Alternatively, the sleeve may be made of heat-shrinkable materials, thus producing the so-called heat-shrinkable sleeves described, for example, in the document U.S. Pat. No. 4,383,131.

Alternatively, as disclosed in document EP-149,032 in the name of the Applicant, the sleeve can be positioned by means of a rigid tubular support, whose cavity has diametrical dimensions grater than the outer dimensions of the two cables to be joined, which cooperates with a device comprising rigid plates and bars the actioning of which causes a sliding movement between the outer surface of the tubular support and the cavity of the sleeve so that a uniform radial contraction of the sleeve takes place in correspondence of the junction zone of the two cables.

Therefore, the joining operation comprises the step of inserting the sleeve, fitted on the tubular support, on the end to be joined of one of the cables before the abovementioned step of electrically connecting the conductors of said cables.

Successively, the sleeve is positioned in correspondence of the joining zone and the tubular support is removed.

Moreover, since generally a joint also comprises an element intended to restore the metal screen of the cables to be spliced, the joining operation further comprises the step of applying a metallic strip, such as, for example, a tin-plated copper strip, starting from the exposed metal screen portion of the first section of a cable and terminating on the exposed metal screen of the second section of the other cable.

Finally, since a joint generally also comprises an external polymeric sheath suitable for restoring the external mechanical protection of the cable, the joining operation further comprises the step of fitting said sheath in the joining zone, in a position radially external to the aforementioned sleeve, so as to protect the underlying elements of the joint from coming into contact with moisture and/or water from the outside.

Said sheath may be of the heat-shrinkable type or of the cold-shrinkable elastic type or may be obtained by means of a strip-forming step, which may also be combined with the use of suitable mastic sealants.

In case said sheath is of the heat-shrinkable type or of the cold-shrinkable elastic type, said fitting step comprises the step of inserting said sheath on one end of one of said cables to be spliced, said step preceding both the positioning of the tubular support carrying the elastomeric sleeve and the formation of the electrical connection between the cables conductors.

In accordance with further operating methods, restoration of the external mechanical protection of the spliced cables may also be achieved by using several sheaths, for example three in number, arranged so that one pair of sheaths is fitted onto the aforementioned frustoconical portions of said joint and a further sheath is fitted onto the substantially cylindrical portion of the latter.

Methods for manufacturing a joint are described, for example, in documents EP-379,056; EP-393,495; EP-415,082; EP-199,742 and EP-422,567 in the name of the Applicant.

Document JP 10224937 discloses a method for obtaining the electrical insulating element of a joint in correspondence of the joining zone of two electrical cables. Said method comprises the step of injecting a plastic material into a metallic mould, after positioning thereinto the electrically connected cables provided with a high voltage shielding electrode at said joining zone, and the step of moulding said insulating element. Said method further comprises the step of cutting the ends of the cylindrical block member obtained from said moulding step so that a specific shape (i.e. a frustoconical shape) is given to the insulating element.

Further technical solutions for extrusion moulding the insulating element of a joint are described, for instance, in documents JP 8280115; JP 3280374; JP 5292624; JP 3167773; JP 5859030; JP 5859029; JP 5859027; U.S. Pat. No. 4,377,547; U.S. Pat. No. 4,241,004; U.S. Pat. No. 3,846,578. According to said documents the extrusion process comprises the step of injecting the insulating material into a moulding cavity having the shape of the desired insulating element. For example, documents JP 8280115 and JP 3280374 disclose the use of pressure regulating valves so that a uniform pressure distribution can be reached within the moulding cavity and the generation of voids inside of the insulating material is prevented. Document JP 5292624 discloses metal dies provided with a plurality of injection holes according to a predetermined pitch along the longitudinal direction of the mould.

Document U.S. Pat. No. 3,880,557 discloses a moulding apparatus suitable for moulding the insulating element of a joint for electrically connecting two cables, preferably two high voltage cables. Said apparatus comprises an upper plate and a lower plate, provided with upper and lower moulds respectively which define a moulding cavity inside of which the insulating material is introduced by passing through an injection unit possessed by the upper plate.

The manufacturing of the insulating element of a joint is particularly critical since any defect in the insulating material, such as disuniformities or entrapped air, can originate microcavities inside the insulating element of the joint. Said defects cause the electric strength of said insulating material to decrease so that the probability of formation of electrical discharges within the joint insulating element remarkably increases. As a consequence, the risk of breakdown of the latter during the service of the joint remarkably increases too.

Furthermore, since said defects decrease the electric strength of the insulating material, the insulating element of the joint can breakdown at an electric field gradient lower than the expected one which can be withstood by the insulating material per se.

Said aspect is critical especially in case high voltage joints are considered. In fact, since the latter usually involve high electric field gradients and great thicknesses of the insulating elements, the risk of breakdown is particularly high, said risk increasing with the thickness of the insulating element and, thus, with the maximum voltage the joint is designed for.

It is known in the art that most part of the electrical discharges which originate in a joint generally develops at the axial ends of the electrode in proximity of the tips thereof where the concentration of the flux lines of the electric field is particularly high and the maximum electric field gradient takes place.

FIG. 23 partially shows a typical distribution of the flux lines 100 of the electric field in proximity of a tip 200 of an electrode 300.

According to said distribution it could be expected that the path of an electrical discharge, developing within the insulating material of a joint, follows the electric field gradient, thus being perpendicular to the flux lines of the electric field, since this represents the shortest path which can be covered by the electrical discharge.

However, the Applicant has noted that the path of the electrical discharge generally does not follow said calculated path but a more complex one. In fact, the Applicant has noted that the path of the electrical discharge is remarkably influenced by any defects present in the insulating material.

This aspect is particularly critical since it means that the electrical discharge moves towards the most defective zones of the insulating material and thus the breakdown of the insulating element of the elastomeric sleeve can occur at voltages even remarkably lower than the expected ones.

The Applicant has perceived that this phenomenon is correlated with the extrusion method that is used for manufacturing the insulating element.

In particular, the Applicant has perceived that this phenomenon is correlated with the method according to which the insulating material is introduced into the mould that is used for manufacturing said insulating element.

As described hereinabove with reference to the known prior art methods for manufacturing the insulating element of an elastomeric sleeve, the insulating material is generally introduced (by extrusion or by injection) into a mould through at least one inlet opening, where the electrode and the stress control screens have previously been positioned on a mandrel.

According to said methods, each portion of insulating material entering the mould is advanced thereinto by the pushing action of the successive portions until the filling of the mould is completed. In other words, the insulating material which is the first to be introduced into the mould is pushed along the mould by the insulating material which successively enters thereinto through the one or more inlet openings of the mould.

The portion of insulating material entering the mould at a given time $t_0$ gives rise to a flow line which, due to the successive portions of insulating material that enter the mould at successive times $t > t_0$, becomes substantially parabolic in shape since the velocity of the portion advancing along the mould is lower in correspondence of the walls of the mould, of the electrode and of the mandrel than the velocity of the portion in correspondence of the central zone comprised among the walls of the mould, of the electrode and of the mandrel.

The Applicant has perceived that the path of an electrical discharge preferably follows one or more of said flow lines or the welding zone of two or more of said flow lines. As it is known in the art, weld lines form whenever advancing melt fronts meet (e.g. see "Principles of polymer processing", Zehev Tadmor, Costas G. Gogos—Wiley-Interscience Publication, 1979, page 594).

Furthermore, the Applicant has perceived that the above mentioned methods of filling a mould with an insulating material for obtaining the electrical insulating element of an elastomeric sleeve give rise to significant anisotropies within the insulating material. Said anisotropies are at least partially due to the fact that each portion of insulating material is caused to advance along the mould by the portions of insulating material entering the mould at successive time instants. It is known that rubber products can exhibit anisotropy and heterogeneity of their physical properties due to molecular orientation which is caused by flow conditions (e.g. see "Mold-flow-induced anisotropy in nitrile rubber", W. V. Chang, P. H. Yang, R. Salovey—Rubber Chemistry and Technology—Vol. 54—May/June 1981, n. 2, page 449).

Anisotropies are particularly critical during the service conditions of the electrical insulating element of the elastomeric sleeve. Moreover, once formed the anisotropies can not be adjusted or at least partially reduced since they remain "freezed" in the insulating material by the step of curing which immediately follows the step of filling the insulating material into the mould.

Therefore, the Applicant has perceived that the step of filling the insulating material into the mould remarkably influences the risk of breakdown of the insulating element of a joint for electrical cables.

In particular, the Applicant has perceived that, during the filling of the mould with the insulating material, the conveying thereof into the mould has to be carried out as uniformly as possible in order to substantially avoid the formation of said anisotropies and thus to reduce the risk of breakdown of the elastomeric sleeve.

More in particular, the Applicant has perceived that the formation of said anisotropies can be remarkably reduced by avoiding that the filling of the mould is carried out by causing each portion of insulating material to be pushed along the mould walls by the portions of insulating material entering the mould at successive time instants. The Applicant has perceived that this is particularly critical especially in proximity of the axial ends of the electrode where the electric field gradient reaches its maximum value and the disuniformity between the insulating material fed at the very beginning of the filling step and the insulating material fed at successive time instants is remarkably high.

SUMMARY OF THE INVENTION

The Applicant has found that the formation of said anisotropies can be substantially avoided or at least remarkably reduced by performing the step of filling the mould in such a way that each portion of insulating material entering the mould overlaps the portion of insulating material which entered the mould at a previous time instant. In this way, the last material entering the mould has the same thermal and rheological history of the material previously introduced into the mould cavity.

In more details, in order to avoid the formation of the abovementioned anisotropies, the Applicant has found that the step of filling the mould to obtain the insulating element of the elastomeric sleeve has to be carried out dynamically, i.e. during the step of introducing into said mould the electrode and the stress control screens of the elastomeric sleeve provided on a supporting element (e.g. a mandrel).

In fact, according to the prior art documents mentioned above, the step of filling the mould is carried out statically by extruding or injecting the insulating material within a mould which statically contains therein the electrode and the stress control screens of the elastomeric sleeve so that said insulating material entering the mould progressively fills the space comprised among the mould walls, the walls of said electrode, of the supporting element and of the stress control screens.

On the contrary, according to the present invention, the step of filling the mould is carried out in a dynamic way since the insulating material is fed to the mould while said supporting element advances into the mould so that the insulating material is caused to gradually fill the free space defined among the mould walls and the walls of the supporting element provided with the electrode and the stress control screens.

Therefore, according to the present invention, each portion of insulating material entering the mould is uniformly distributed over a substantially transverse cross-section of the mould and overlaps the portions of insulating material already present within the mould thereby avoiding any pushing actions, and thus any mechanical/thermal stresses, on the portions of insulating material. As a consequence, the formation of the abovementioned flow lines is advantageously avoided or remarkably reduced.

Therefore, in a first aspect the present invention relates to a process for manufacturing an elastomeric sleeve of a joint for electrical cables, said sleeve comprising:
   an electric field-control element;
   an electrical insulating element surrounding said electric field-control element, and
   at least two stress control screens positioned at the axial ends of said electrical insulating element,
   said process comprising the steps of:
   providing said electric field-control element and said stress control screens on a supporting element;
   introducing said supporting element into a mould provided for moulding said electrical insulating element made of an electrical insulating material;
   filling with said electrical insulating material the space radially external to said electric field-control element and the space comprised between said electric field-control element and said stress control screens, said step of filling being carried out during said step of introducing, and
   curing said electrical insulating material to obtain said electrical insulating element of said elastomeric sleeve.

Preferably, the supporting element is moved into said mould and is inserted coaxially with respect to said mould.

More preferably, the supporting element is moved within the mould in a substantially vertical direction. In so doing, since the step of filling the mould with the insulating material is carried out in combination with the advancing of the supporting element inside the mould, by vertically advancing the supporting element thereinto, each portion of insulating material entering the mould is caused to overlap the portion of insulating material entered at a previous time instant. This is particularly advantageous since each portion of insulating material simply superimposes the portions which previously entered the mould and this kind of deposition does not cause or drastically reduces the formation of the flow lines within the insulating material during the filling of the mould.

Preferably, the step of filling the mould with the insulating material comprises the step of extruding said insulating material. Alternatively, the step of filling the mould with the insulating material comprises the step of injecting the insulating material.

According to a first embodiment of the present invention, the insulating material is filled into the mould in a first direction while the supporting element is introduced into said mould in a second direction which is substantially perpendicular to said first direction. Preferably, said second direction is a substantially vertical direction.

According to a further embodiment of the present invention, the insulating material is filled into the mould in a direction corresponding to the direction of introduction of the supporting element into said mould, i.e. the insulating material is filled into the mould in the same direction of the supporting element which is advanced into the mould. According to said embodiment, the filling of the mould with the insulating material and the introduction of the supporting element into the mould can be performed with identical or opposite verses.

According to the present invention, the step of filling the mould with the insulating material comprises the step of uniformly distributing said insulating material over the transverse section of said mould. Said aspect is very important in order to obtain a uniform filling of the mould so that the insulating material entering the mould fills the free space around the electrode and comprised among the electrode, the supporting element and the stress control screens without inducing mechanical/thermal stresses in the insulating material.

According to the present invention, the step of filling the mould with the insulating material is correlated to the volume of the free space which has to be filled with said insulating material, and which surrounds the electrode and is comprised among the electrode, the supporting element and the stress control screens.

In more details, since the supporting element provided with the electrode and the stress control screens is caused to advance into the mould while the ingress of the insulating material remains unchanged during the advancing of said supporting element, the volume of the free space facing the inlet opening of the insulating material varies during the advancing of the supporting element.

Therefore, in order to carry out a complete and uniform filling of said volume, taking into account the changes thereof, said step of filling can be carried out by maintaining substantially constant the flow of insulating material to be fed into the mould and varying the advancing speed of the supporting element. According to said service conditions, the advancing speed of the supporting element is caused to increase when the volume of the free space facing the inlet opening decreases. This is due to the fact that, since the flow of insulating material is maintained substantially constant during the step of filling, a higher speed of the supporting element provides for a wider free space to be filled with the insulating material. On the contrary, the advancing speed of the supporting element is caused to decrease when the volume of the free space facing the inlet opening increases so that a higher amount of insulating material can be provided.

Alternatively, the step of filling can be carried out by maintaining substantially constant the advancing speed of the supporting element and varying the flow of insulating material to be fed into the mould with respect to the volume changes mentioned above. Therefore, according to said service conditions, the flow of insulating material is caused to increase when the volume of the free space facing the inlet opening increases. This is due to the fact that, since the advancing speed of the supporting element is maintained substantially constant during the step of filling, a wider free space to be filled with the insulating material requires a higher flow of insulating material to be provided for. On the contrary, the flow of insulating material is caused to decrease when the volume of the free space facing the inlet opening decreases so that a lower amount of insulating material is provided for.

The process of the present invention further comprises the step of curing the insulating material to obtain the insulating element of the elastomeric sleeve. Said step of curing is carried out at the end of the step of filling when the supporting element is completely introduced into the mould. The curing step is carried out by providing a suitable heat amount for crosslinking said insulating material according to any method known in the art.

The process of the present invention can further comprise a cooling step of the cured insulating material.

The process according to the invention further comprises the steps of removing from said mould the elastomeric sleeve supported on the supporting element and successively releasing said elastomeric sleeve from said supporting element.

In a further aspect the present invention relates to an apparatus for manufacturing an elastomeric sleeve of a joint for electrical cables, said sleeve comprising:
  an electric field-control element;
  an electrical insulating element surrounding said electric field-control element, and
  at least two stress control screens positioned at the axial ends of said electrical insulating element,
said apparatus comprising:
  a grasping and handling device for holding and moving a supporting element provided with said electric field-control element and said two stress control screens;
  a housing for allocating a mould provided for moulding said electrical insulating element;
  a control unit for introducing said supporting element into said mould.

BRIEF DESCRIPTION OF THE DRAWINGS

The present invention is now further illustrated with reference to the attached figures, wherein.

DETAILED DESCRIPTION OF THE INVENTION

For simplicity of description, in the appended drawings, same reference signs correspond to similar or identical components.

In the present description, the term high voltage refers to a tension equal to or greater than 45 kV (very high voltage is also sometimes used in the art to define voltages greater than about 150 or 220 kV and up to 500 kV or more); the term medium voltage is used to refer to a tension typically from about 10 to about 45 kV and the term low voltage refers to a tension lower than 10 kV, typically greater than 100 V.

Figure 1:
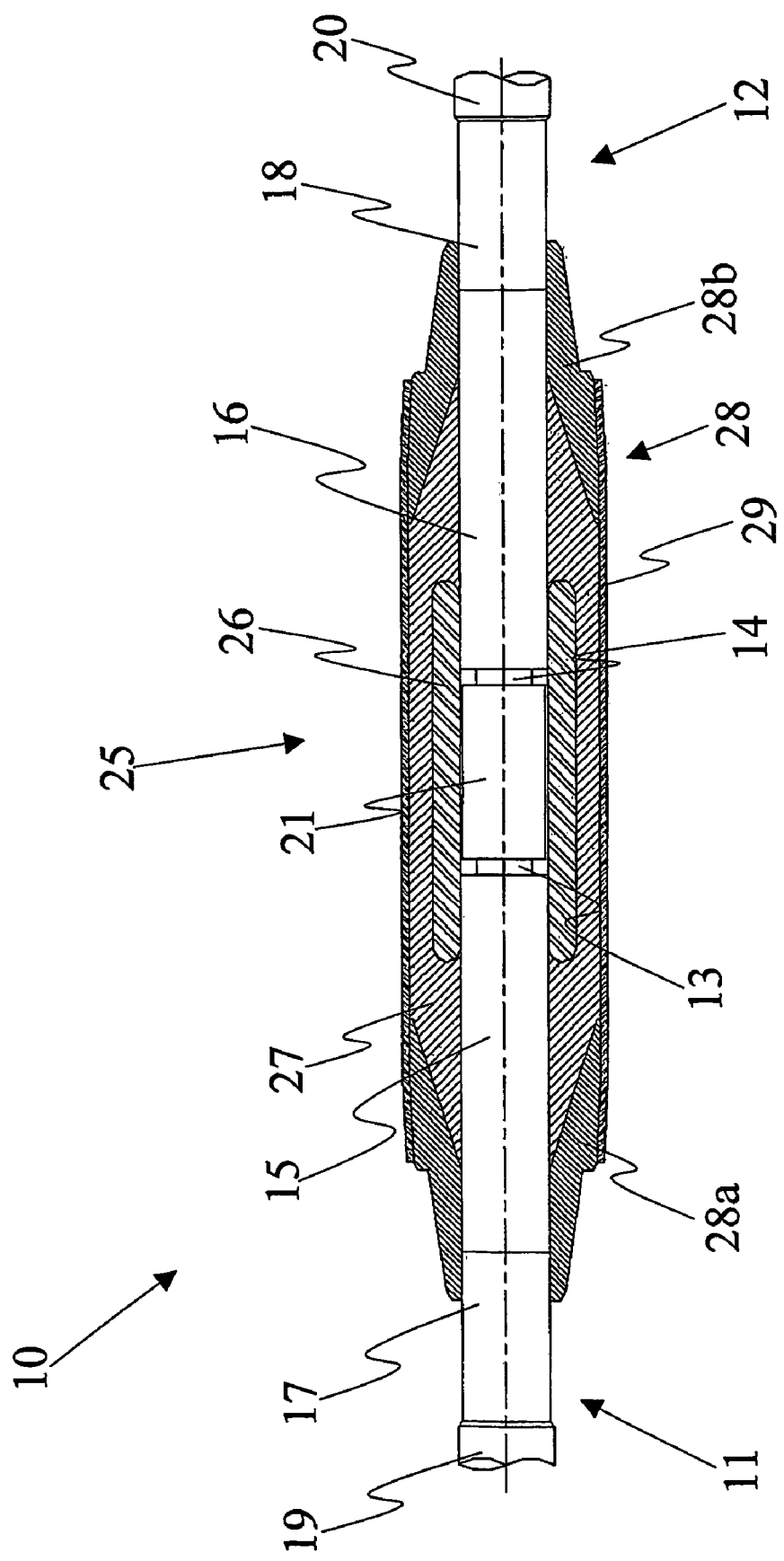
FIG. 1 shows a partially axially-sectioned, schematic side view of the joining zone of two electrical cables.

In FIG. 1 reference sign 10 indicates a joint for the electrical connection of a pair of cables 11, 12 of the single-core type.

As mentioned above, the joint 10 is obtained by arranging, coaxially facing each other, the ends of said cables 11, 12 progressively stripped, in a staggered way, of their associated coating layers forming part of the respective conductors 13, 14 which are exposed over a predefined section.

The coating of said cables 11, 12 is removed by exposing, for each cable and over a given length, in succession the insulating layer 15, 16, the outer semiconductive layer 17, 18, the metallic screen (not shown in FIG. 1) and the external polymeric sheath 19, 20. The inner semiconductive layer (not shown in FIG. 1), which is positioned radially internal to the insulating layer, does not need to be removed in a staggered way.

The exposed end portions of each conductor 13, 14 are electrically and mechanically end-to-end connected, for example by means of a metallic element 21 (e.g. a compression clamp) or by a welding zone (not shown).

The joining zone is covered by an elastomeric sleeve 25 which is slidably fitted onto one end of one of the cables 11, 12 before they are connected together and successively positioned above said joining zone once the electrical and mechanical connection of the conductors 13, 14 has been performed.

The sleeve 25 comprises a semiconductive electrode 26 which is positioned in correspondence of the joining zone, at least partially contacting the insulating layers 15, 16 of the cables 11, 12.

The sleeve 25 further comprises an insulating element 27 into which said electrode 26 is embedded, the axially extension of said insulating element being such as to come into contact with most part of said insulating layers 15, 16.

The sleeve 25 further comprises a semiconductive element 28 which comprises two cup-shaped stress control screens 28a, 28b and an insulation screen 29.

The stress control screens 28a, 28b, which partially contact the insulating layers 15, 16 and the outer semiconductive layer 17, 18 of the cables 11, 12, have the function of conveying the electric field.

The insulation screen 29, which is made of semiconductive material, electrically connects the stress control screens 28a, 28b so as to restore in the joining zone the continuity of the semiconductive layers of the cables 11, 12.

As mentioned above, said sleeve 25 is positioned in correspondence of the joining zone by using any known techniques—for example by means of a removable support element—so as to form a covering of the exposed sections of the insulating layer 15, 16.

Figure 2:
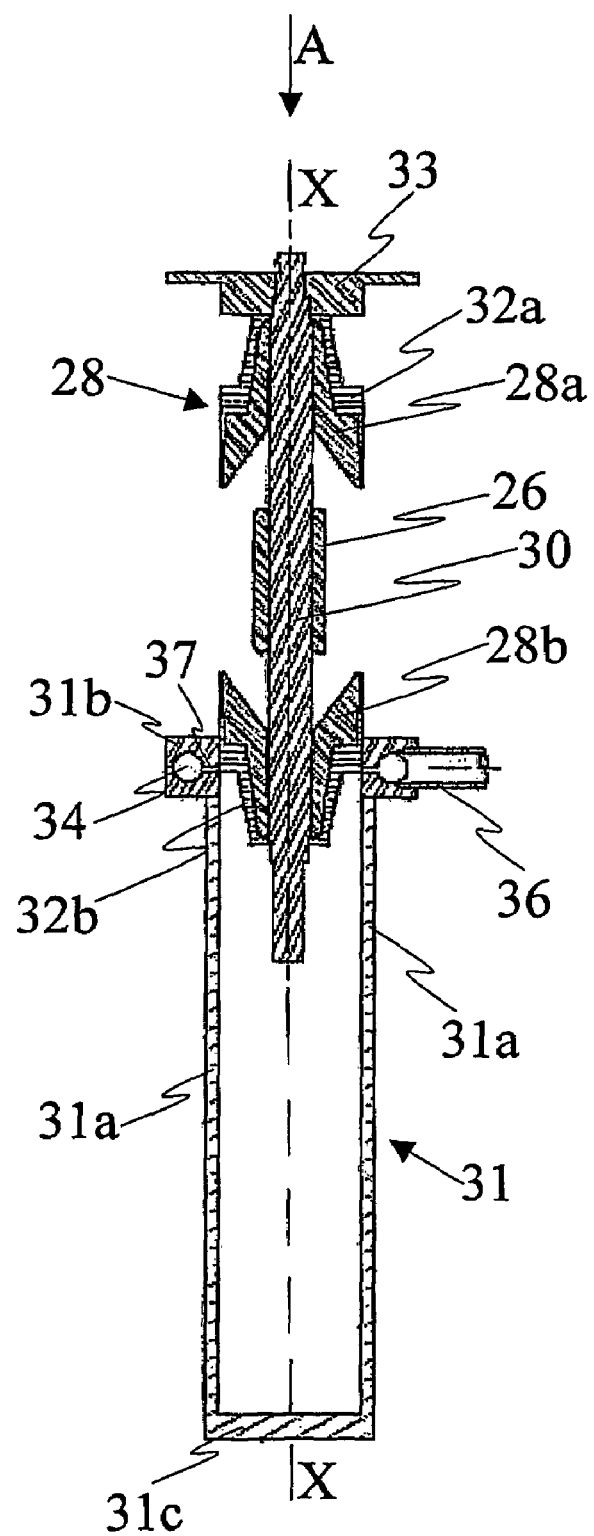
FIGS. 2 to 4 show schematic views of successive operative conditions concerning the step of filling a mould with an insulating material for manufacturing the insulating element of an elastomeric sleeve according to a first embodiment of the present invention.
Figure 3:
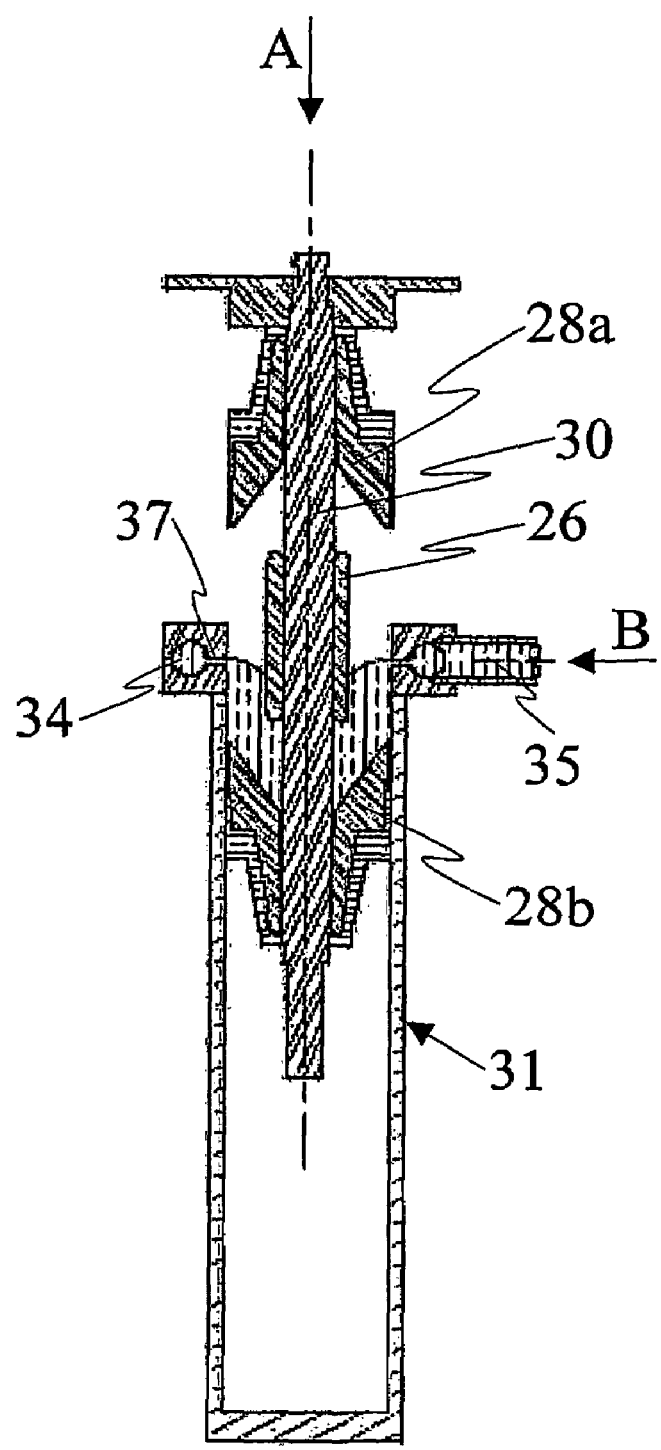
Figure 4:
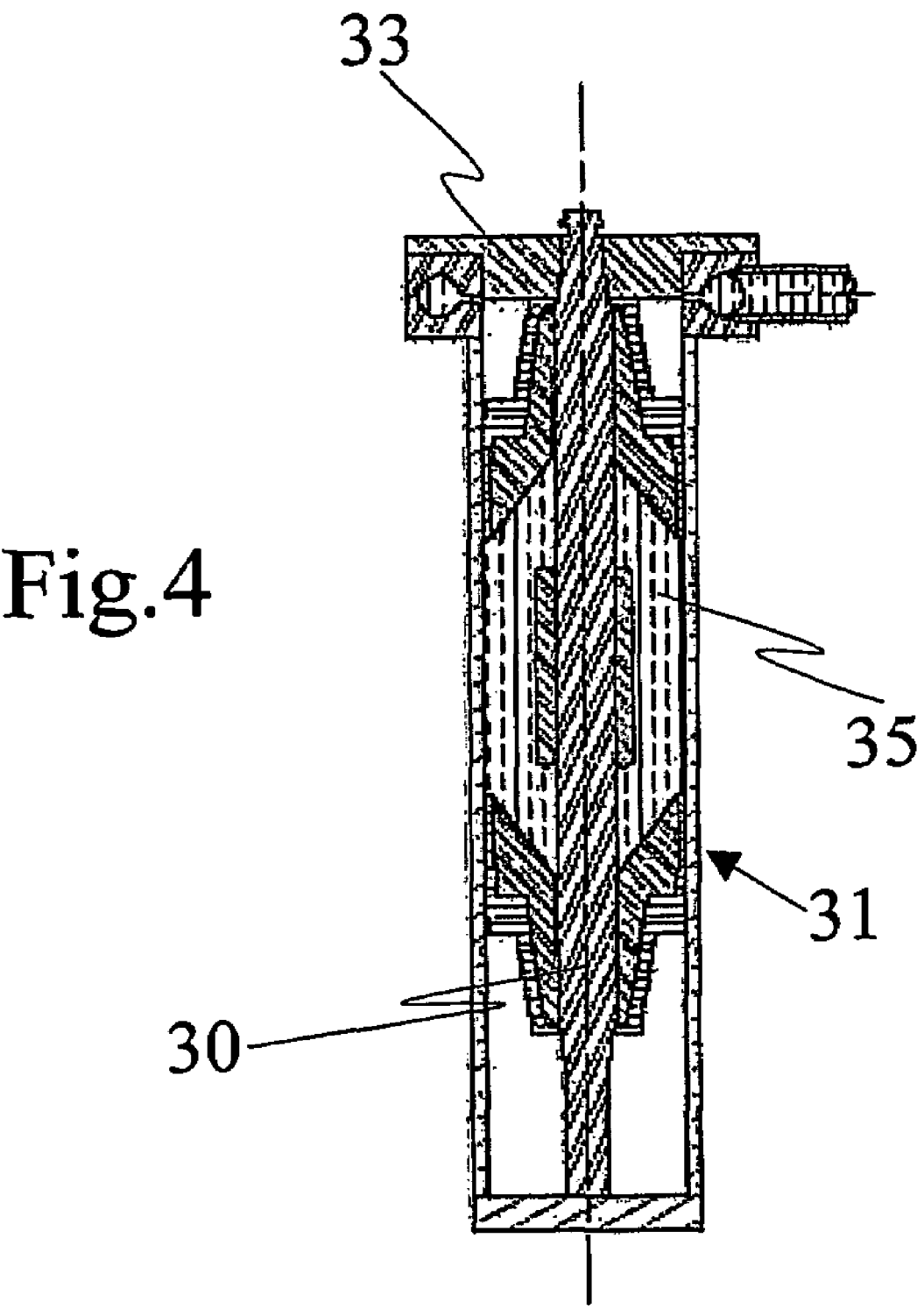
Figure 5:
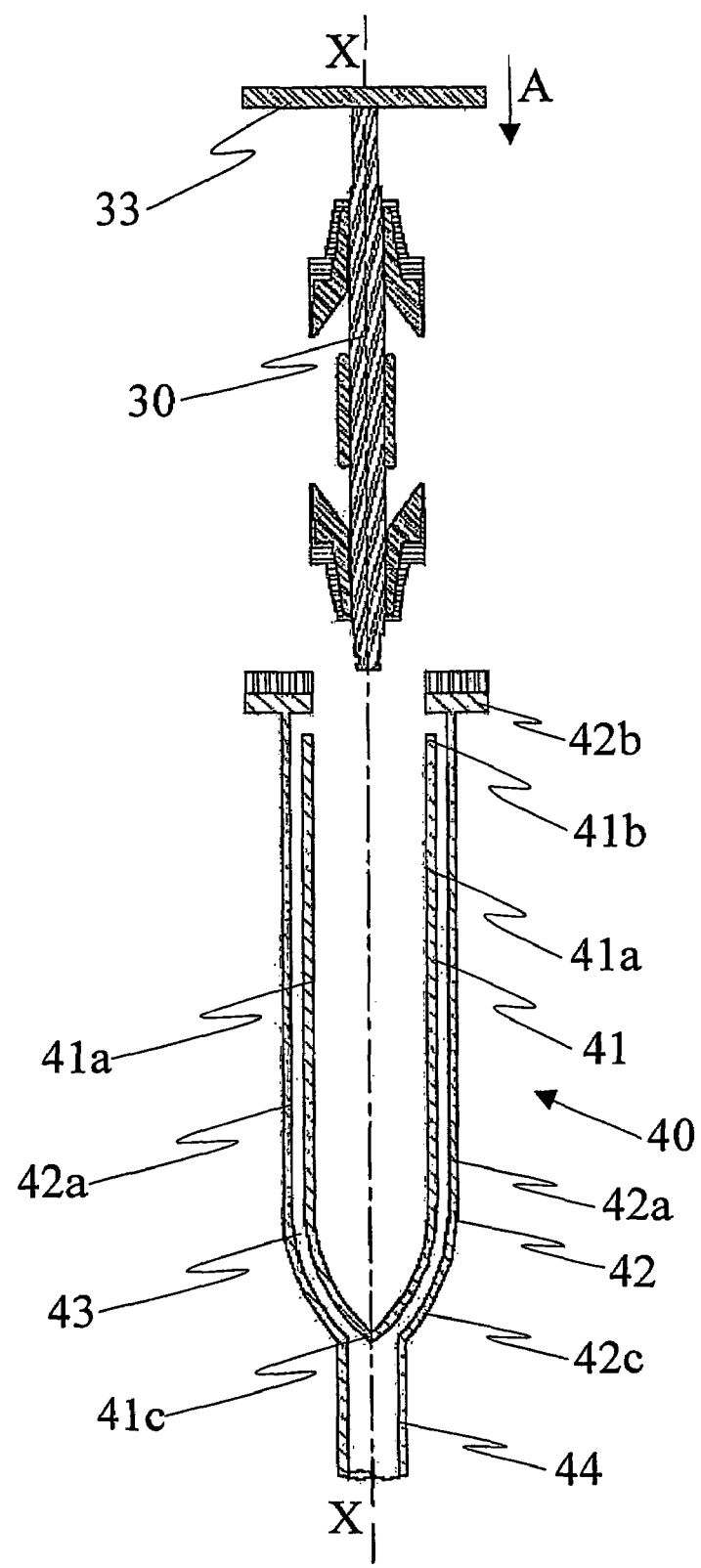
FIGS. 5 to 10 show schematic views of successive operative conditions concerning the step of filling a mould with an insulating material for manufacturing the insulating element of an elastomeric sleeve according to a second embodiment of the present invention.

FIGS. 2 to 4 schematically show the step of filling a mould with an insulating material for manufacturing the insulating element of an elastomeric sleeve according to a first embodiment of the present invention.

In more details, FIG. 2 to 4 show schematic frontal views, partially in longitudinal cross-section, which describe some operative conditions of said step of filling at different and successive time instants.

With reference to FIG. 2, a supporting element 30 (e.g. a mandrel), which is provided with the electrode 26 and the two stress control screens 28a, 28b, is shown while being introduced into a mould 31, at the very beginning of the introduction step.

According to said first embodiment of the present invention, the mould 31 is a tubular shaped element which is provided with side walls 31a, with a first open end 31b, suitable for the introduction of the supporting element 30 into the mould, and with a second close end provided with a bottom wall 31c.

The two stress control screens 28a, 28b are coaxially fixed to the supporting element 30 by means of two holding elements 32a, 32b respectively. Said holding elements 32a, 32b, which are preferably made of metal, are the housings for said stress control screens 28a, 28b.

Furthermore, at one end of the supporting element 30, i.e. at the end which does not enter the mould 31, the supporting element is further provided with a plate 33 which abuts the holding element 32a that enters the mould 31 at the end of the step of introducing. Said plate 33 has principally the function of closing the mould 33 when the supporting element 30 is fully introduced thereinto.

As shown in FIG. 2, the supporting element 30 and the mould 31 are positioned in a substantially vertical direction and are coaxially arranged (as indicated by axis X-X).

According to said first embodiment of the present invention, the mould open end 31b is provided with an annular channel 34 suitable for feeding the mould 31 with the insulating material 35 (shown in FIGS. 3 and 4).

The channel 34 is connected with a feeding duct 36 which is provided for feeding the insulating material 35 into the mould 31.

Preferably, the feeding duct 36 is connected with one or more extruders (not shown) for obtaining the insulating material 36. Alternatively, the feeding duct 36 is connected with one or more injectors (not shown).

Preferably, the channel 34 is in the shape of a toroid.

Preferably, the channel 34 is coaxial with the supporting element 30.

Preferably, the equatorial plane of the channel 34 is substantially perpendicular to the advancing direction (indicated by arrow A) of the supporting element into the mould 31.

Furthermore, the annular channel 34 is provided with a slit 37 that brings in fluid communication the channel 34 with the internal volume (i.e. the cavity) of the mould. The slit 37 has the function of distributing the insulating material 35, which entered the feeding duct 36, over the transverse cross section of the mould 31.

With reference to the equatorial plane of the channel 34, the slit 37 is preferably arranged on the radially internal peripheral profile of said channel.

Preferably, said slit is provided continuously over the whole peripheral profile of the channel.

Preferably, the dimensions of said slit vary along said radially internal peripheral profile of the channel. In more details, the transverse dimensions of said slit, i.e. the dimensions of the slit in a plane perpendicular to the equatorial plane of the channel (said transverse dimensions defining the amount of insulating material which is fed into the mould), reach their minimum value in proximity of the feeding duct 36 and increase while departing from the latter, reaching their maximum value in correspondence of the position diametrically opposite to the position of said feeding duct.

In FIG. 3 the supporting element 30 is shown partially introduced into the mould 31, i.e. FIG. 3 shows the step of introducing the supporting element into the mould and the step of filling the mould with the insulating material at a time instant which is successive to that shown in FIG. 2.

In more details, FIG. 3 shows the insulating material 35 entering the feeding duct 36 (as indicated by arrow B), filling the annular channel 34 and thus, thanks to the presence of the slit 37, filling the mould, i.e. the free volume defined by the internal walls of the mould, the walls of the electrode 26, the walls of the stress control screens 28a, 28b and the walls of the supporting element 30.

In FIG. 4 the supporting element 30 is shown completely introduced into the mould 31 at the end of the step of introducing and of the step of filling, the free volume mentioned above having been completely filled with the insulating material 35.

FIG. 4 further shows how the plate 33 mechanically interacts with the mould open end 31b to suitably close the mould 31.

Preferably, the introduction of the supporting element 30 into the mould 31 along the direction X-X is carried out by moving downwards (arrow A) the supporting element into the mould. Alternatively, the introduction step according to the present invention is carried out by moving upwards the supporting element into the mould, i.e. the latters are rotated of 180° with respect to the ones shown in FIGS. 2 to 4.

FIGS. 5 to 10 schematically show the step of filling a mould with an insulating material for manufacturing the insulating element of an elastomeric sleeve according to a second embodiment of the present invention.

In more details, FIGS. 5 to 10 show schematic frontal views, partially in longitudinal cross-section, which describe some operative conditions of the step of filling at different and successive time instants.

According to said second embodiment, the mould is provided with a conveyor for introducing the insulating material into the moulding cavity. Therefore, the mould has two distinct functions: a) to convey the insulating material into the mould; b) to receive inside of its internal volume the supporting element (advancing according to arrow A) for carrying out the moulding of the insulating element of the elastomeric sleeve. This means that, according to said embodiment, the steps of conveying and moulding the insulating material are performed by the same device 40 which operates as a conveyor and as a mould.

In more details, the device 40 (see FIG. 5) comprises a first substantially tubular component 41 which, in the service conditions, is positioned in a vertical direction and is arranged so as to coaxially receive the supporting element 30 thereinto.

The first component 41, i.e. the mould, comprises side walls 41a, an open end 41b, suitable for the introduction of the supporting element 30, and a close end provided with a cup-shaped bottom wall 41c.

Furthermore, the device 40 comprises a second substantially tubular component 42 which coaxially surrounds said first component 41 so as to obtain an interspace 43 between said first and second components for conveying the insulating material 35 into the mould.

Said second component 42, i.e. the conveyor, comprises side walls 42a, an open end 42b, suitable for the introduction of the supporting element 30, and an open cup-shaped bottom end 42c which is connected with a feeding duct 44 for feeding the insulating material 35 into the mould 41.

Preferably, the feeding duct 44 is connected with one or more extruders (not shown). Alternatively, the feeding duct 44 is connected with one or more injectors (not shown).

Figure 6:
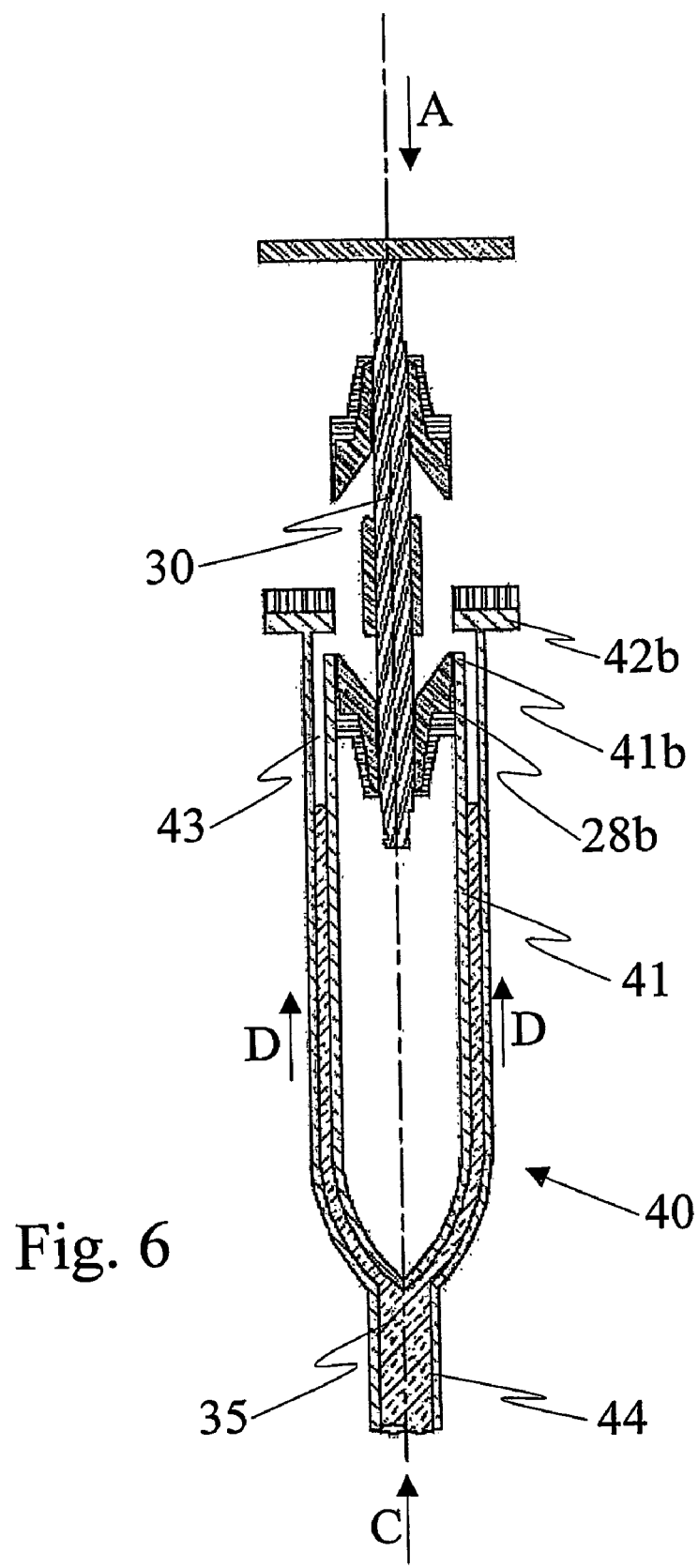

In FIG. 6 the supporting element 30 is shown partially introduced into the mould 41 and the space comprised among the internal walls of the mould 41, the walls of the stress control screens 28b and the walls of the supporting element 30 is ready to be filled with the insulating material 35 which has entered the feeding duct 44, as indicated by arrow C.

In FIG. 6 the insulating material 35 is moving along the interspace 43 (as indicated by arrow D) and gradually fills it.

According to said second embodiment, the feeding duct 44, and thus the extruding or injecting apparatus connected thereto, is positioned at the bottom end 41c of the mould 41. Moreover, due to such a configuration, the bottom end 41c of the mould 41 is advantageously cup-shaped so that the insulating material, which enters through the feeding duct 44, can be uniformly distributed into the interspace 43.

Figure 7:
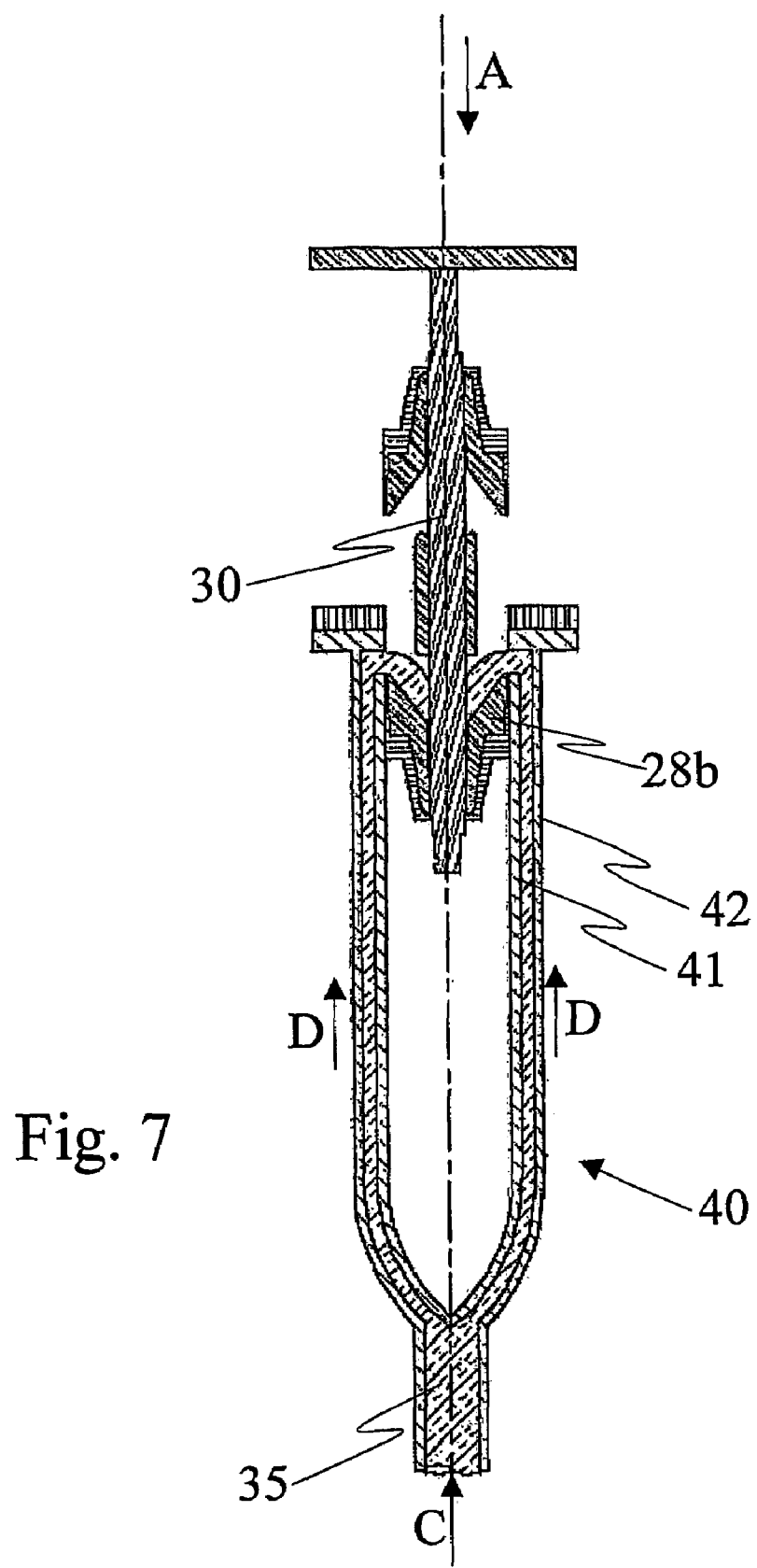

FIG. 7, which refers to a service condition at a successive time instant with respect to the service condition shown in FIG. 6, describes the filling of the insulating material 35 in the space comprised among the internal walls of the mould 41, the walls of the stress control screen 28b and the walls of the supporting element 30.

FIG. 7 clearly shows that, when the conveyor 42 is completely filled with the insulating material, the latter starts filling the mould 41 due to the different longitudinal extension of the mould walls in respect to the conveyor walls. In fact, since the longitudinal extension of the mould walls is lower than that of the conveyor walls, the insulating material overflows into the mould 41. Therefore, the gradually filling of the mould occurs, while the introduction of the supporting element 30 into the mould continuously provides for a free volume to be filled.

Figure 8:
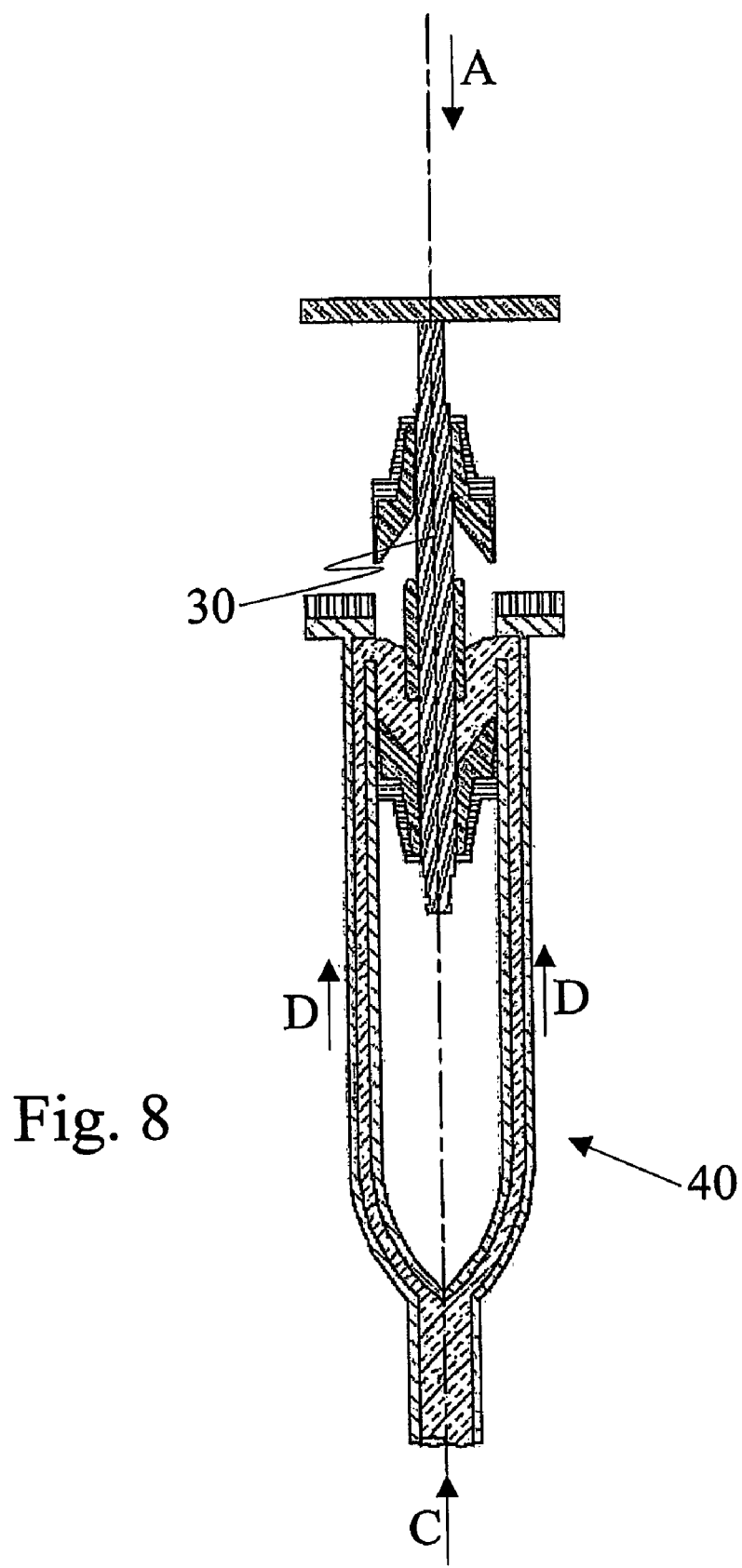
Figure 9:
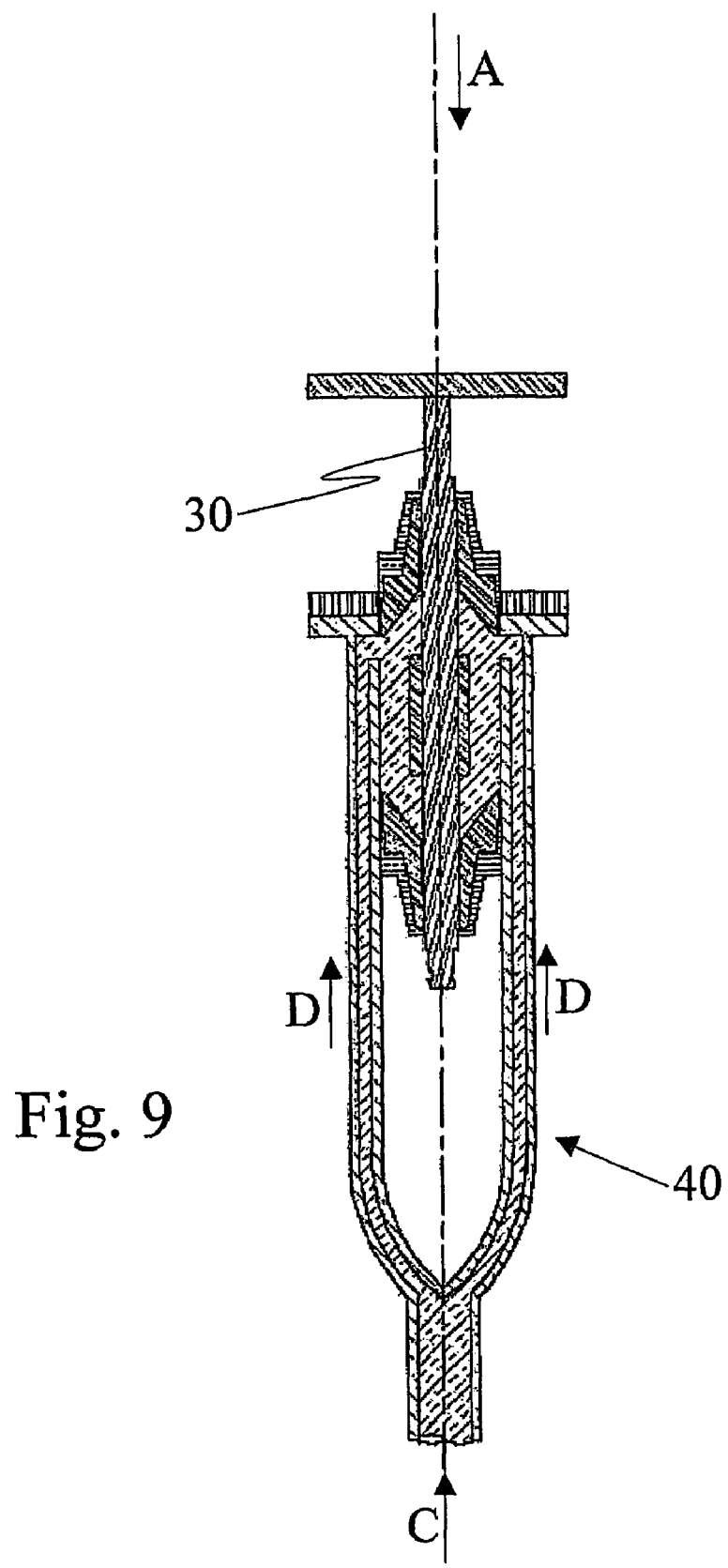

FIGS. 8 and 9 show two successive time instants of the filling step according to the invention. In particular, FIG. 9 shows the time instant in which no more free volume to be filled is present and the filling step of the mould is completed.

Figure 10:
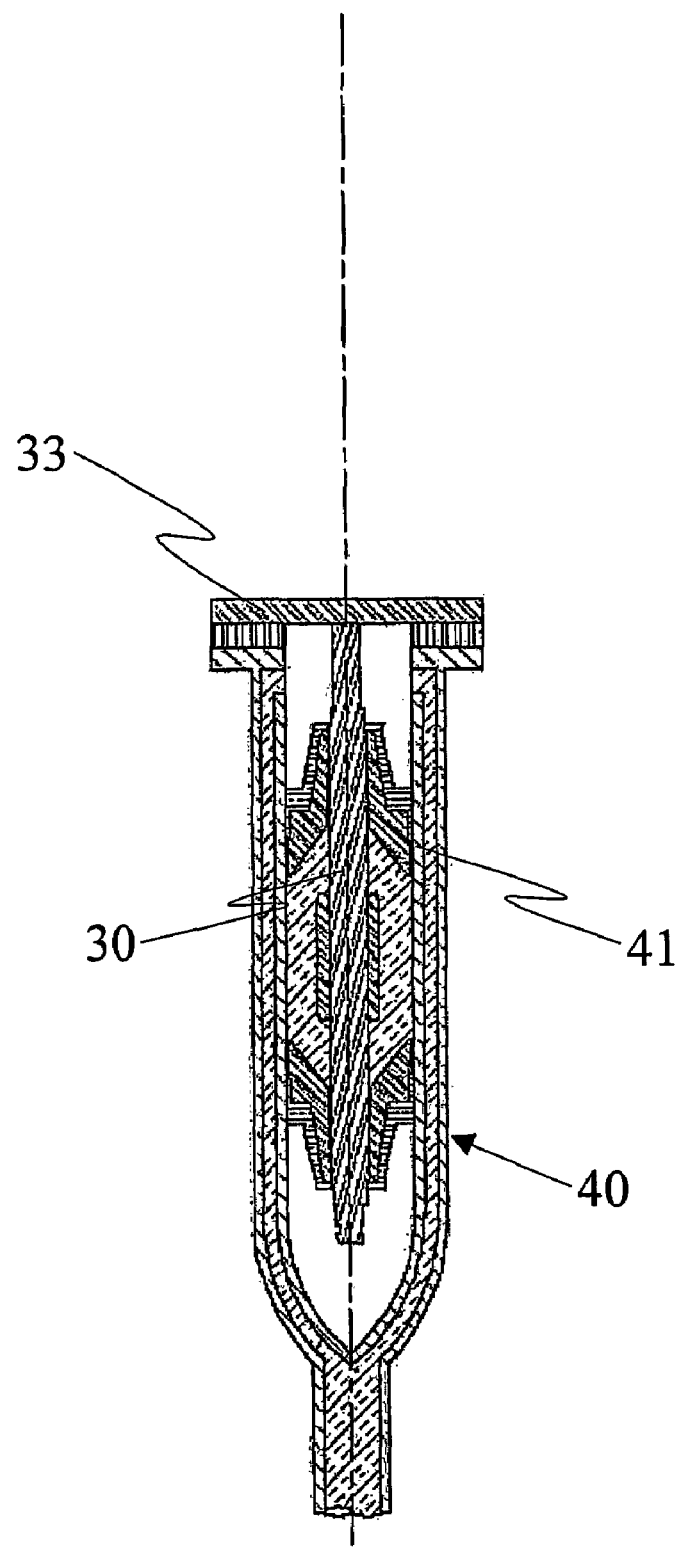
Figure 11:
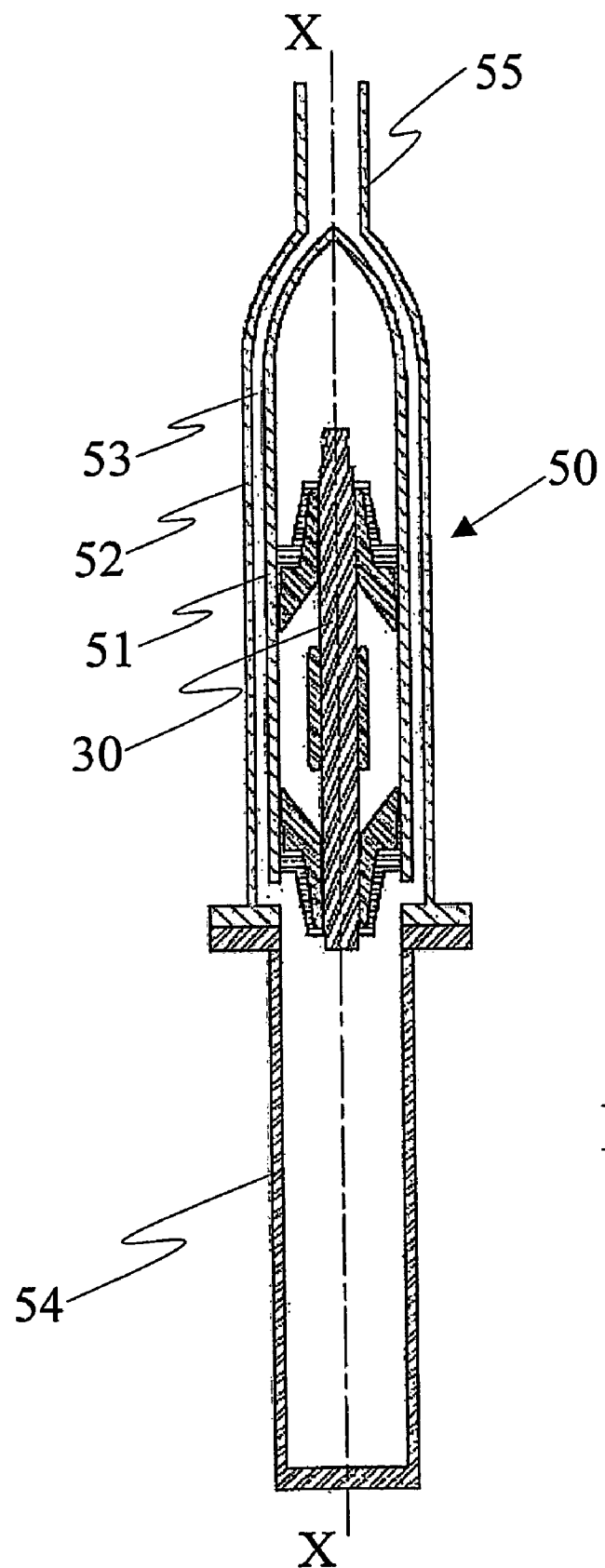
FIGS. 11 to 17 show schematic views of successive operative conditions concerning the step of filling a mould with an insulating material for manufacturing the insulating element of an elastomeric sleeve according to a third embodiment of the present invention.

In FIG. 10 the supporting element 30 is shown completely introduced into the mould 41 and the plate 33 is in mechanical connection with the device 40 so as to perform the closing thereof.

Preferably, the introduction of the supporting element 30 into the mould 41 along the direction X-X is carried out by moving downwards (arrow A) the supporting element into the mould. Alternatively, the introduction step according to the present invention is carried out by moving upwards the supporting element into the mould, i.e. the latters are rotated of 180° with respect to the ones shown in FIGS. 5 to 10.

The second embodiment of the present invention is particularly advantageous in remarkably reducing the formation of any welding zones in the insulating element of the elastomeric sleeve. In fact, the presence of the conveyor 42 allows the insulating material to be distributed over the transverse cross-section of the mould without the need that said insulating material splits into two different flows in order to go through an annular channel as described with reference to FIGS. 2 to 4.

FIGS. 11 to 16 schematically show the step of filling a mould with an insulating material for manufacturing the insulating element of an elastomeric sleeve according to a third embodiment of the present invention.

In more details, FIGS. 11 to 16 show schematic frontal views, partially in longitudinal cross-section, describing some operative conditions of the step of filling at different and successive time instants.

According to said embodiment a device 50 is used which comprises (see FIG. 11) a first substantially tubular component 51 and a second substantially tubular component 52 coaxially surrounding said first component 51 to form an interspace 53 for conveying the insulating material 35.

According to said third embodiment, at the beginning of the filling step, the supporting element 30 is placed inside the device 50 which has the function of conveying the insulating material 35 entering (as indicated by arrow C in FIG. 12) a feeding duct 55. A mould 54 is associated with said device 50 and is provided for receiving thereinto the supporting element 30 in order to carry out the moulding of the insulating element of the elastomeric sleeve.

Figure 12:
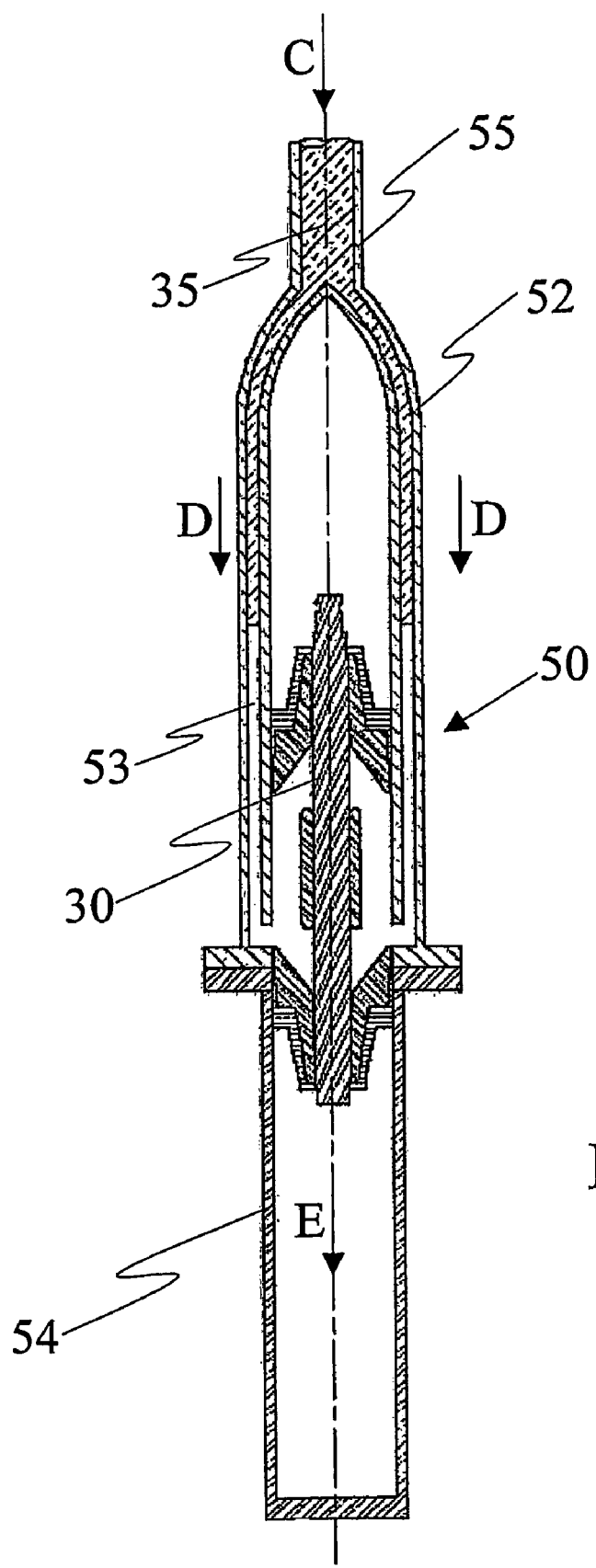

In more details, as shown in FIG. 12, the feeding duct 55 is connected with said second component 52 of said device 50 so that the insulating material 35 is conveyed into the interspace 53 defined between said first 51 and second 52 components.

According to said embodiment, as indicated by arrow E, the supporting element 30 is caused to exit from the device 50 and to enter the mould 54 while the insulating material 35 is conveyed (as indicated by arrow D) along the interspace 53.

Figure 13:
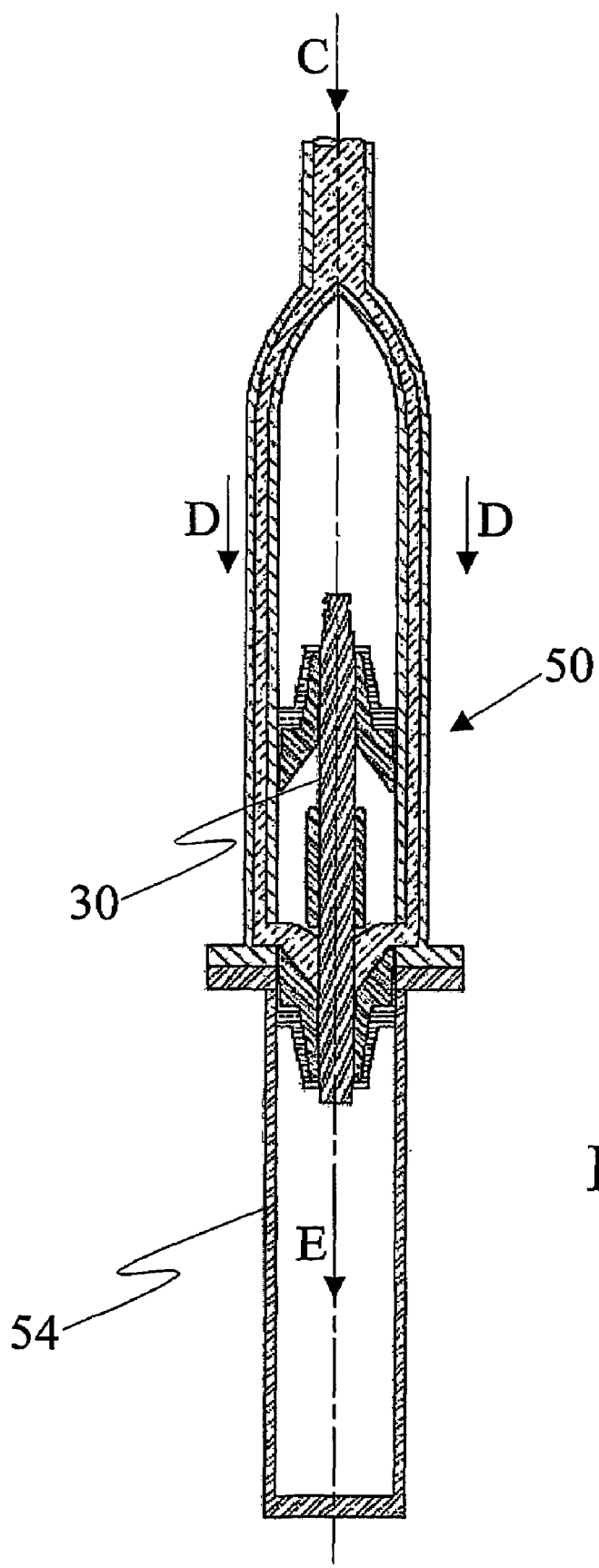
Figure 14:
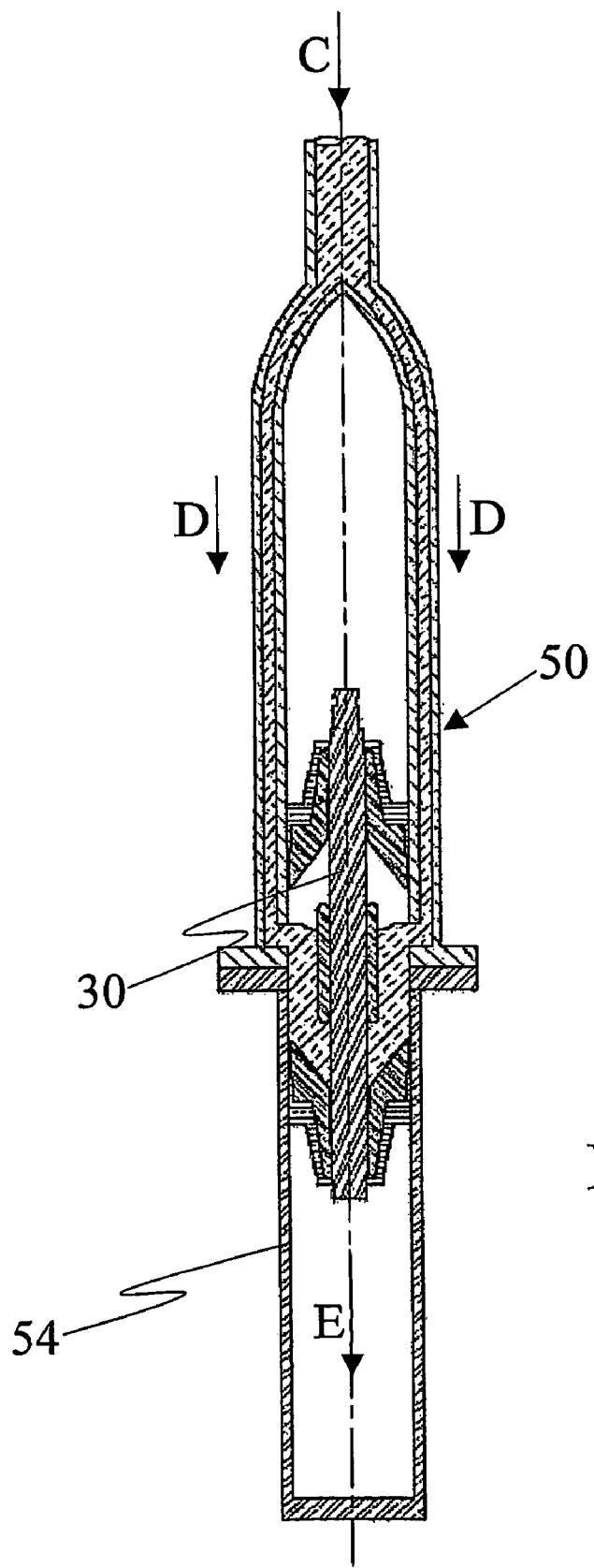
Figure 15:
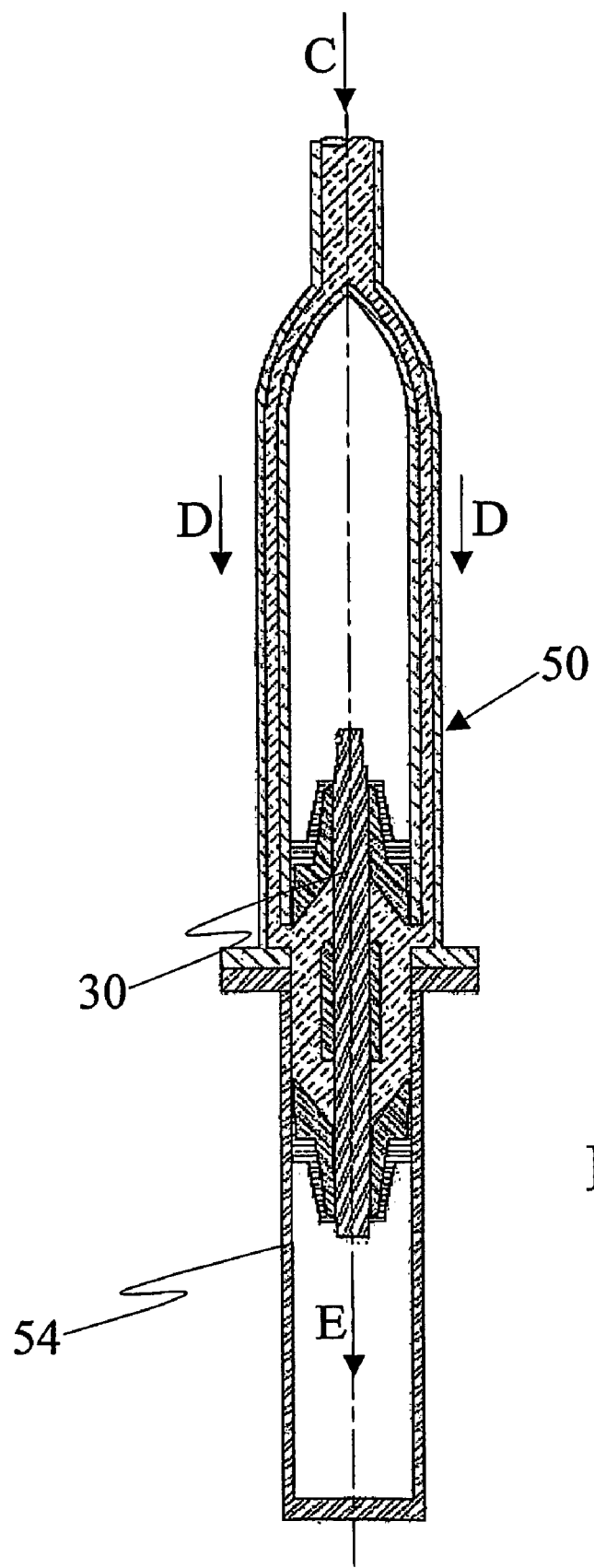

FIGS. 13 to 15 show different and successive time instants of the filling step according to the invention.

Figure 16:
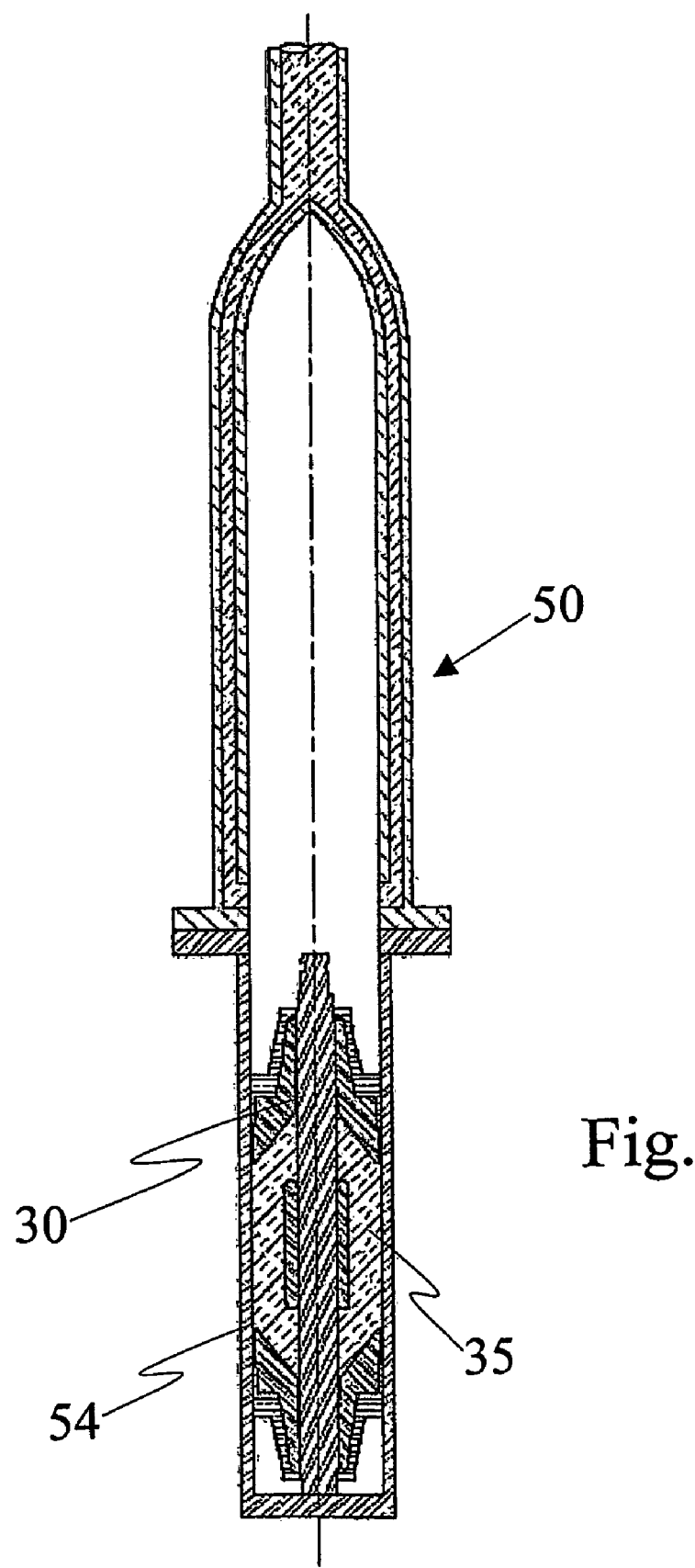

FIG. 16 shows the supporting element 30 completely introduced into the mould 54 at the end of the filling step of the invention.

Figure 17:
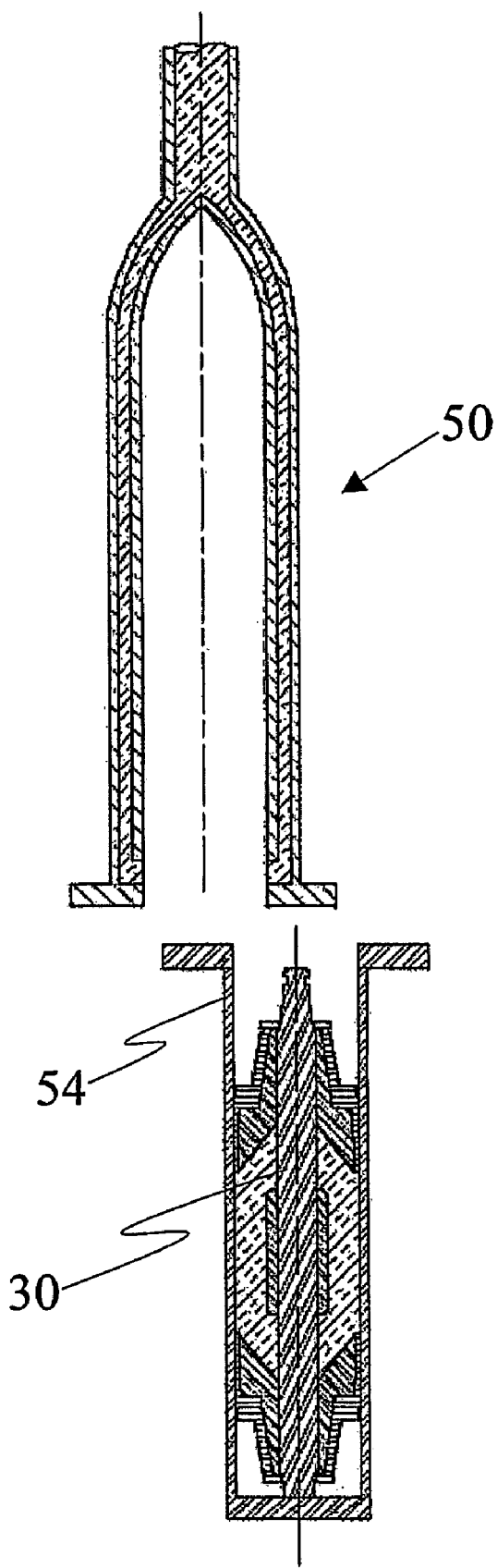

FIG. 17 shows the step of disconnecting the mould 54 from the device 50 before the curing step of the insulating element. Alternatively, the step of disconnecting the mould 54 from the device 50 can be carried out after the curing step.

Preferably, the introduction of the supporting element 30 into the mould 54 along the direction X-X is carried out by moving downwards (arrow E) the supporting element into the mould. Alternatively, the introduction step according to the present invention is carried out by moving upwards the supporting element into the mould, i.e. the latters are rotated of 180° with respect to the ones shown in FIGS. 11 to 17.

Figure 18:
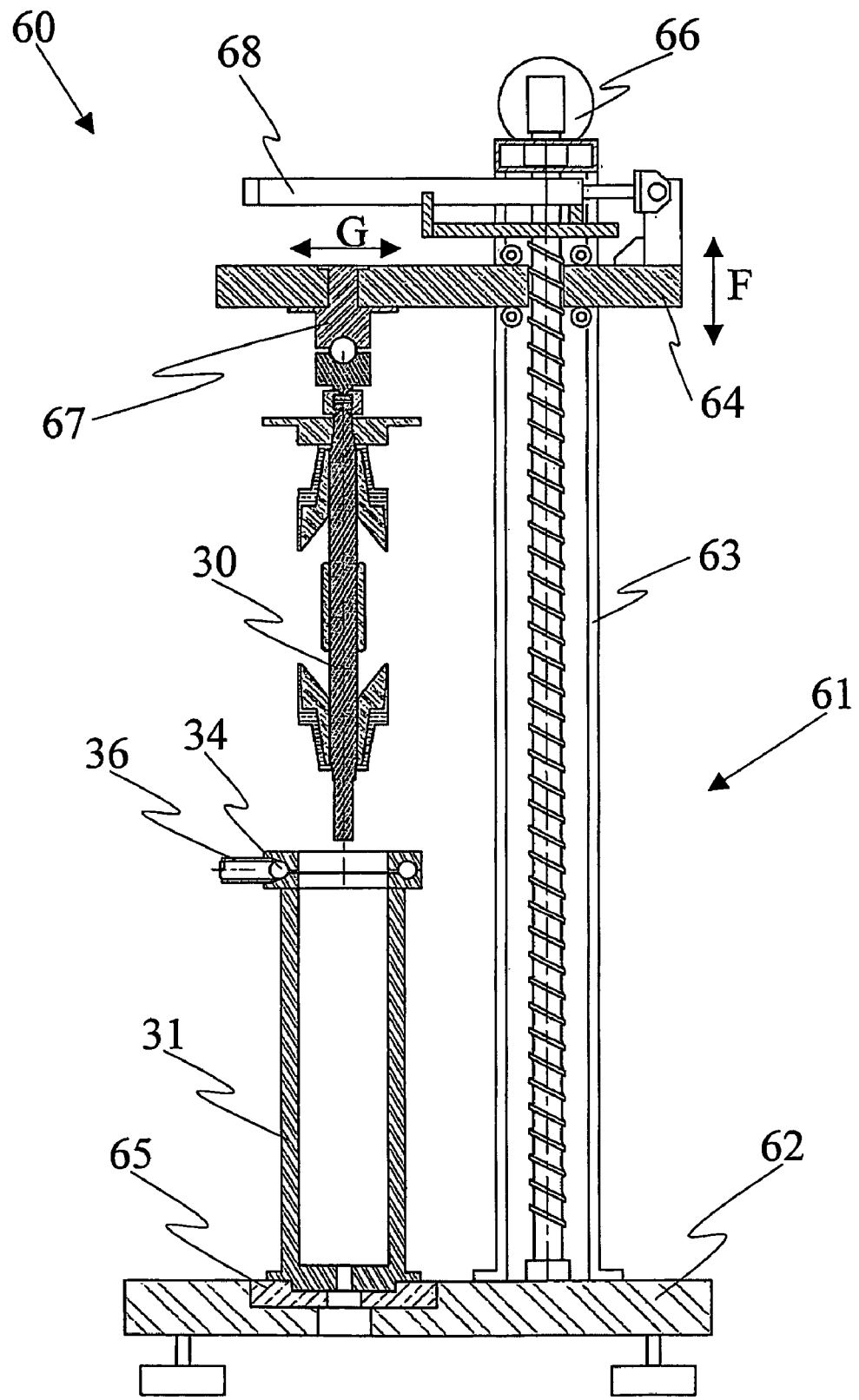
FIG. 18 shows a partially cross-sectioned, schematic side view of an apparatus for manufacturing the insulating element of an elastomeric sleeve according to a first embodiment of the present invention.

FIG. 18 shows a partially cross-sectioned, schematic side view of an apparatus 60 for manufacturing the insulating element of an elastomeric sleeve according to the first embodiment of the present invention described above with reference to FIGS. 2 to 4.

The apparatus 60, according to the embodiment shown in FIG. 18, comprises a frame 61 which includes a base 62, two upright members 63 (only one shown in FIG. 18) and two cross members 64 (only one shown in FIG. 18).

Furthermore, the apparatus 60 comprises a control unit which includes any suitable device (e.g. motor units and hydraulic circuits) which can be used for allowing the movement of any movable components of said apparatus.

In more details, the base 62 is provided with a housing 65 which is suitable for allocating the mould 31 in a position substantially perpendicular with respect to said base 62.

The cross member 64 is substantially perpendicular with respect to the upright member 63 and can be vertically translated (as indicated by arrows F) along said upright member 63.

Preferably, the translation movement of said cross member 64 is performed by a motor unit 66.

The cross member 64 is provided with a grasping and handling device 67 (e.g. a locking fastener) which holds the supporting element 30 and allows the movement thereof during the manufacturing process of the present invention.

Preferably, the grasping and handling device 67 is horizontally translated (as indicated by arrows G) along the cross members 64 so that the supporting element 30 can be coaxially arranged with respect to the mould 31 and introduced thereinto.

Preferably, the translation movement of said grasping and handling device 67 is performed by a hydraulic circuit 68.

According to the first embodiment of the apparatus of the present invention, the supporting element, already provided with the electrode and the stress control screens, is took by the grasping and handling device 67 and gradually introduced into the mould 31.

As described above with reference to FIGS. 2 to 4, while the supporting element is introduced into the mould by means of the lowering action (as indicated by arrows F of FIG. 18) of the cross members 64, the insulating material 35 is fed, through the feeding duct 36, to the channel 34 and thus is caused to fill the free space comprised among the walls of the supporting element, of the electrode, of the mould and of the stress control screens.

At the end of the filling step, when the supporting element has been completely introduced into the mould, a heat amount is provided to the insulating material through the mould for a given period of time which is necessary to perform the curing step of said insulating material.

In order to carry out the curing step, the mould 31 comprises a heating circuit (not shown in the figures) for providing the insulating material with a suitable heat amount. For example, said circuit can comprise a plurality of conduits inserted in the mould walls and inside of which a heating fluid is caused to flow.

At the end of the curing step, the process of the present invention can further comprise a cooling step which can be carried out, for example, by using the heating circuit mentioned above and causing a coolant to flow within the conduits thereof.

Successively, the supporting element 30 is lifted, by means of the vertical movement (as indicated by arrow F) of the cross members 64, and disangaged from the grasping and handling device 67 so that the elastomeric sleeve 25 can be released by removing the holding elements 32a, 32b and the plate 33 from the supporting element 30.

Figure 19:
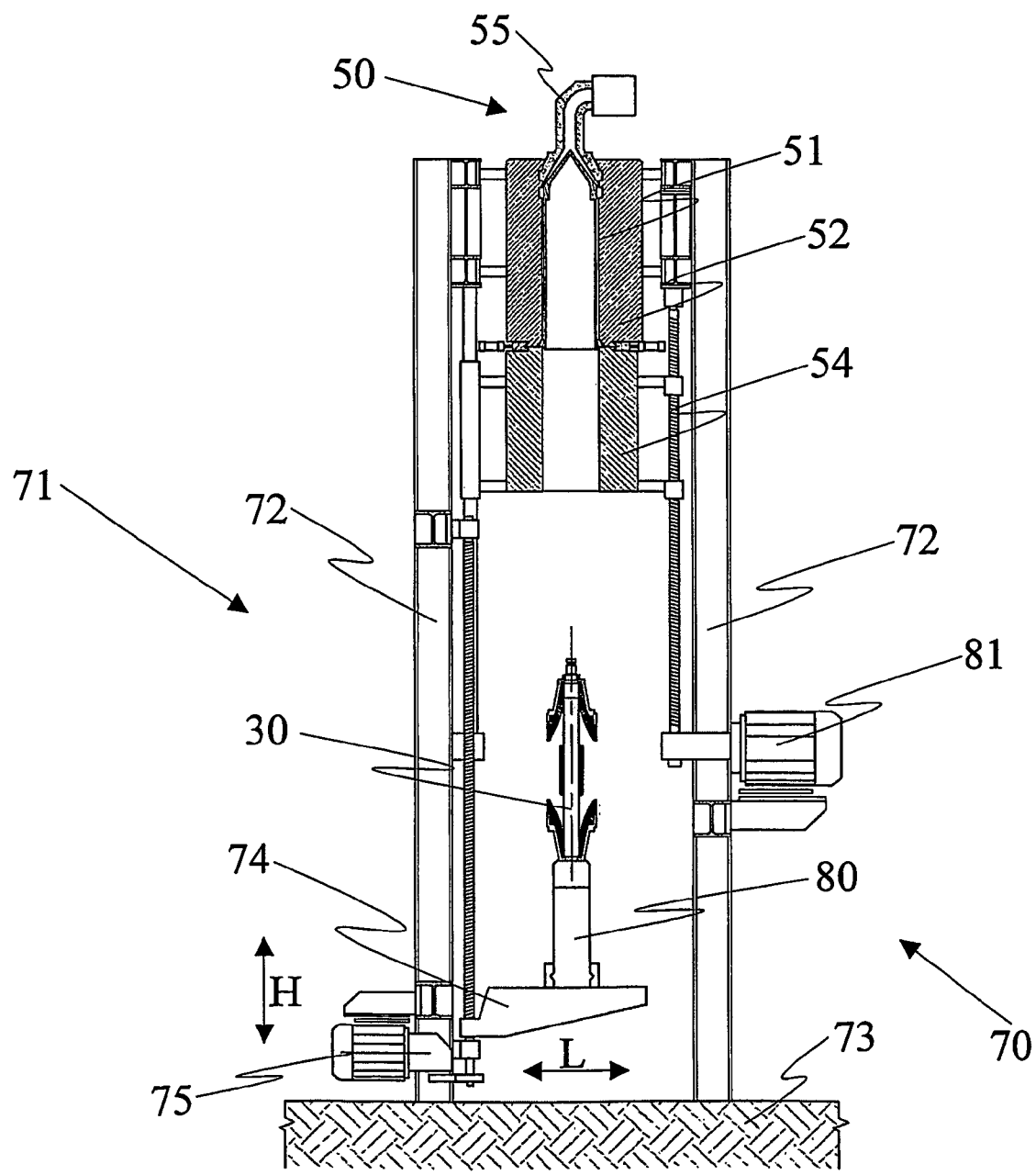
FIGS. 19 to 21 show partially cross-sectioned, schematic frontal views of an apparatus for manufacturing the insulating element of an elastomeric sleeve according to a further embodiment of the present invention, said apparatus being represented in different and successive operative conditions thereof.
Figure 20:
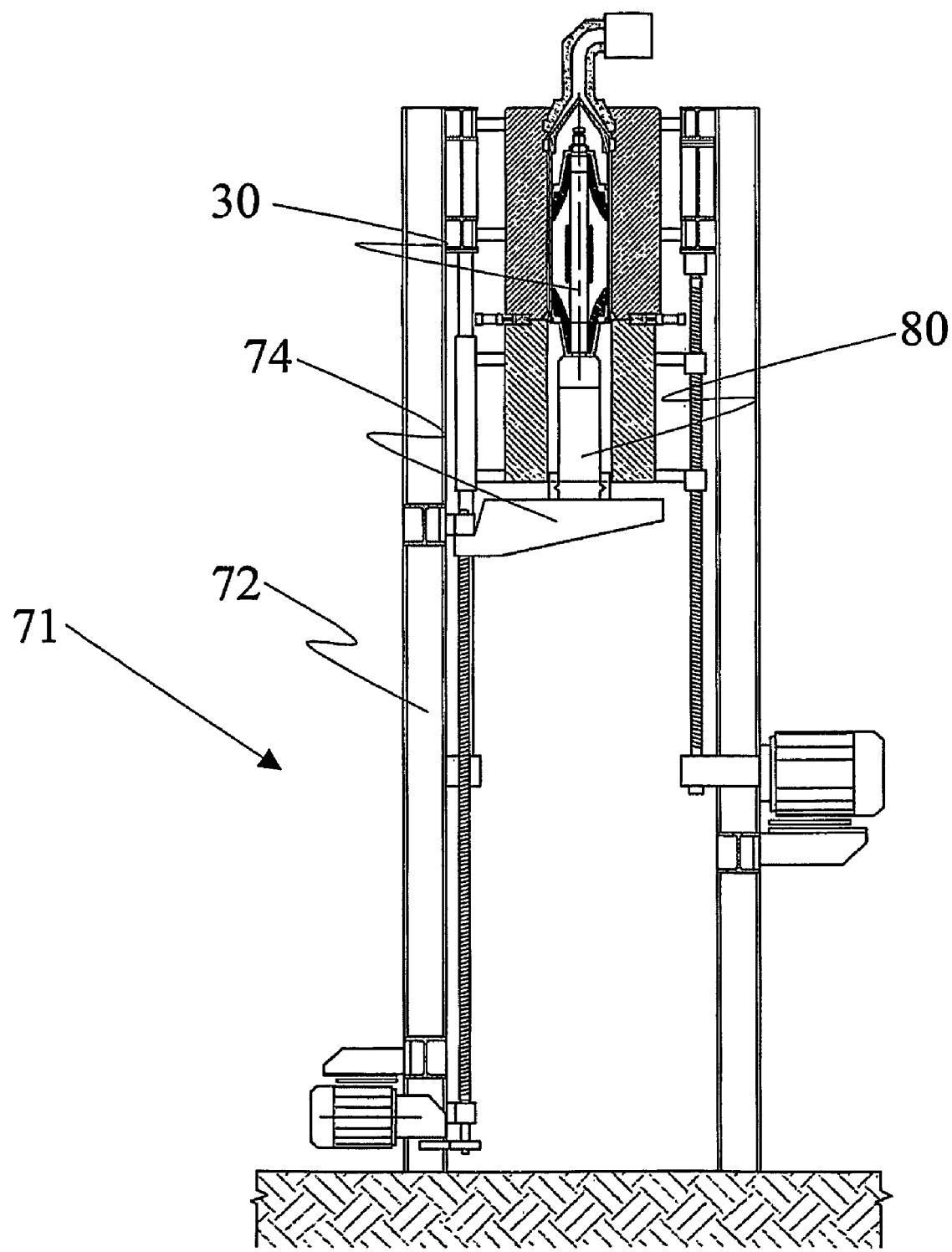
Figure 21:
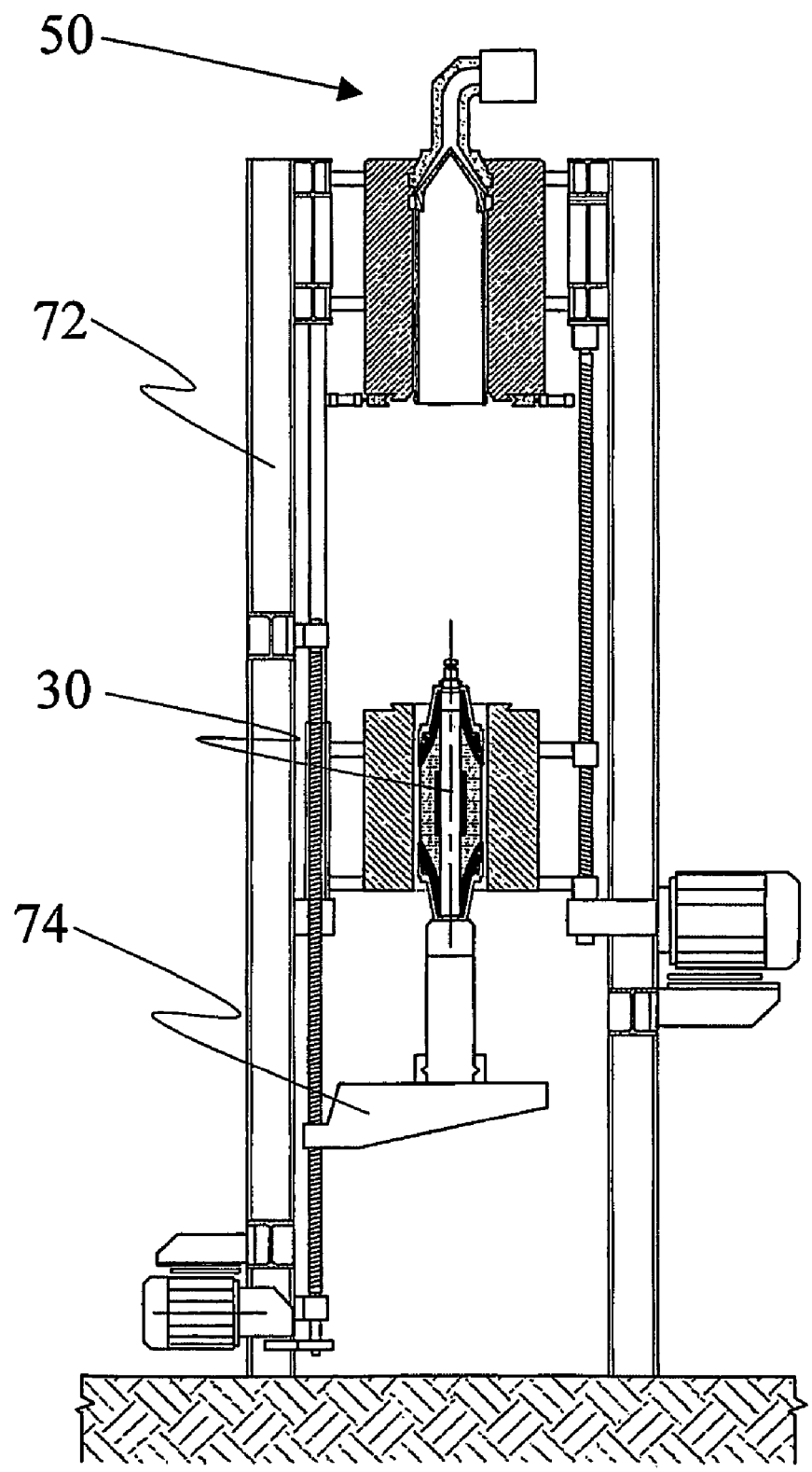

FIGS. 19 to 21 show partially cross-sectioned, schematic frontal views of a further embodiment of an apparatus 70 for manufacturing the insulating element of an elastomeric sleeve according to the third embodiment of the present invention described above with reference to FIGS. 11 to 17.

FIGS. 19 to 21 show the apparatus 70 in different and successive time instants of its operation.

The apparatus 70 comprises a frame 71 which includes upright members 72 (only two shown in FIG. 19) which are associated to a base element 73 as described with reference to FIG. 18. Alternatively, the frame 71 can be fixed to the ceiling so that no base element 73 is required.

The upright members 72 are arranged to support the device 50 for conveying and moulding the insulating material. In more details, said device 50 is associated to the upper ends of the upright members 72 while a cross member 74 is provided to vertically translate (as indicated by arrows H) along at least one of said upright member 72.

Preferably, the translation movement of said cross member 80 is performed by a motor unit 75.

The cross member 74 is provided with a grasping and handling device 80 which holds the supporting element 30 during the manufacturing process of the present invention, coaxially arranges the supporting element 30 with respect to the device 50 and introduces the supporting element 30 into said device 50.

The grasping and handling device 80 can horizontally translate (see arrow L) along the cross member 74, e.g. by means of a hydraulic circuit (not shown).

Furthermore, the apparatus 70 comprises a motor unit 81 for the vertical movement of the mould 54 along the uprights 72 at the end of the curing step.

According to said embodiment, the filling of the mould is carried out as previously described with reference to FIGS. 11 to 17.

As mentioned above with reference to FIG. 18, the supporting element 30, already provided with the electrode and the stress control screens, is taken by the grasping and handling device 80 and gradually introduced into the device 50.

While the supporting element is introduced into the device 50 by lifting (as indicated by arrow H of FIG. 19) the cross member 74, the insulating material 35 is fed, through the feeding duct 55, to the device 50 and thus is caused to fill the free space comprised among the supporting element, the internal walls of the device 50 (i.e. the internal walls of the first component 51), the walls of the electrode and the walls of the stress control screens.

At the end of the filling step, when the supporting element has been completely introduced into the device 50 (as shown in FIG. 20), a suitable heat amount is provided to the insulating material through said device 50 in order to complete the curing step.

At the end of the curing step, optionally after a cooling step has been carried out, the supporting element 30 is lowered (as shown in FIG. 21), by means of the vertical movement (as indicated by arrows H of FIG. 19) of the cross member 74, and the elastomeric sleeve 25 is released from the supporting element 30.

With reference to the filling step of the free volume comprised among the mould walls, the walls of the electrode, of the supporting element and of the stress control screens, the carrying out of said step is hereinbelow described with reference to the first embodiment of the present invention as shown in FIGS. 2 to 4. It is apparent that any information given with respect to said embodiment can be suitably translated to any further embodiments of the present invention.

As shown in FIG. 2, the supporting element 30 (provided with the electrode 26 and the stress control screens 28a, 28b) is caused to advance (as indicated by the arrow A) into the mould 31 while the ingress of the insulating material does not change being maintained at the same height corresponding to the open end 31b of the mould 31. As shown in FIG. 2, the insulating material enters the mould 31 by means of the slit 37 provided to the annular channel 34.

Therefore, due to the presence of the electrode and of the stress control screens, the free volume mentioned above, which faces the slit 37 at different and successive time instants of the filling step according to the invention, varies during the advancing of the supporting element 30.

In order to carry out a complete and uniform filling of said volume taking into account the changes thereof, according to a first service condition said step of filling can be carried out by maintaining substantially constant the rate of flow of the insulating material which is fed into the mould and by varying the advancing speed of the supporting element. This means, for instance, that the speed of the supporting element is increased when the volume of the free space facing the slit decreases and is decreased when the volume of the free space facing the slit increases. The speed of the supporting element is proportional to the rate of flow of the extruder and is inversely proportional to the derivative of the volume to be filled within the mould, i.e. to the volume per length unit of the insulating element profile.

Alternatively, according to a further service condition, the step of filling can be carried out by maintaining substantially constant the advancing speed of the supporting element and varying the flow of insulating material which is fed into the mould with respect to the volume changes mentioned above. Therefore, the flow of insulating material is increased when the volume of the free space facing the slit increases and the flow of the insulating material is decreased when the volume of the free space facing the slit decreases.

In order to better explain said service conditions, the present invention is now further illustrated by the following working examples.

EXAMPLE 1

Invention

Figure 22:
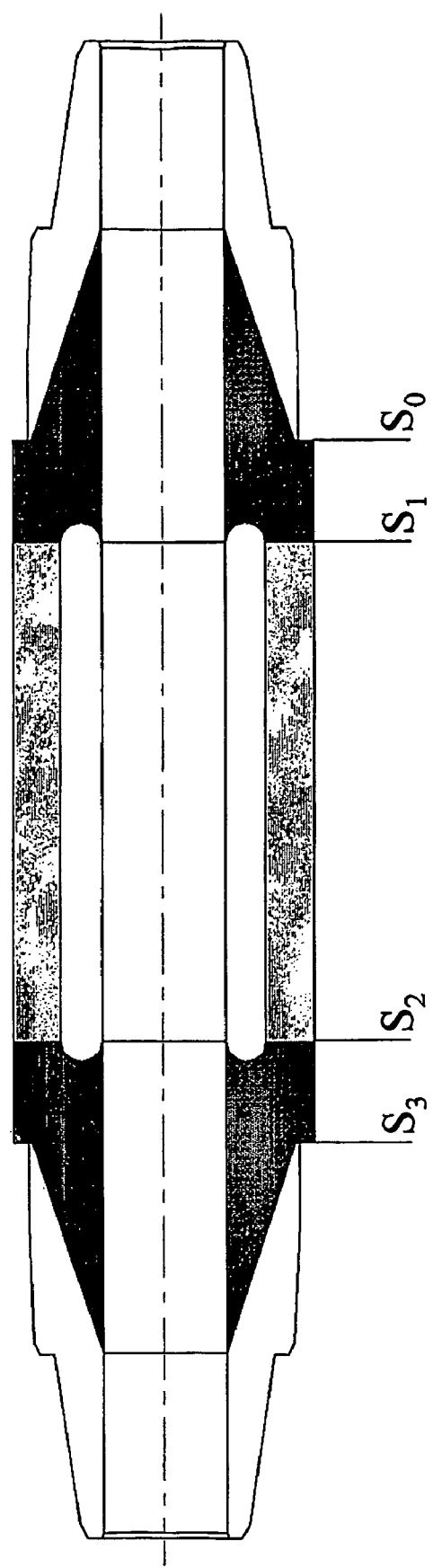
FIG. 22 shows a partially cross-sectioned, schematic longitudinal view of an elastomeric sleeve obtained with the present invention, and FIG. 23 partially shows the distribution of the flux lines of the electric field in correspondence of a tip of an electrode.
Figure 23:
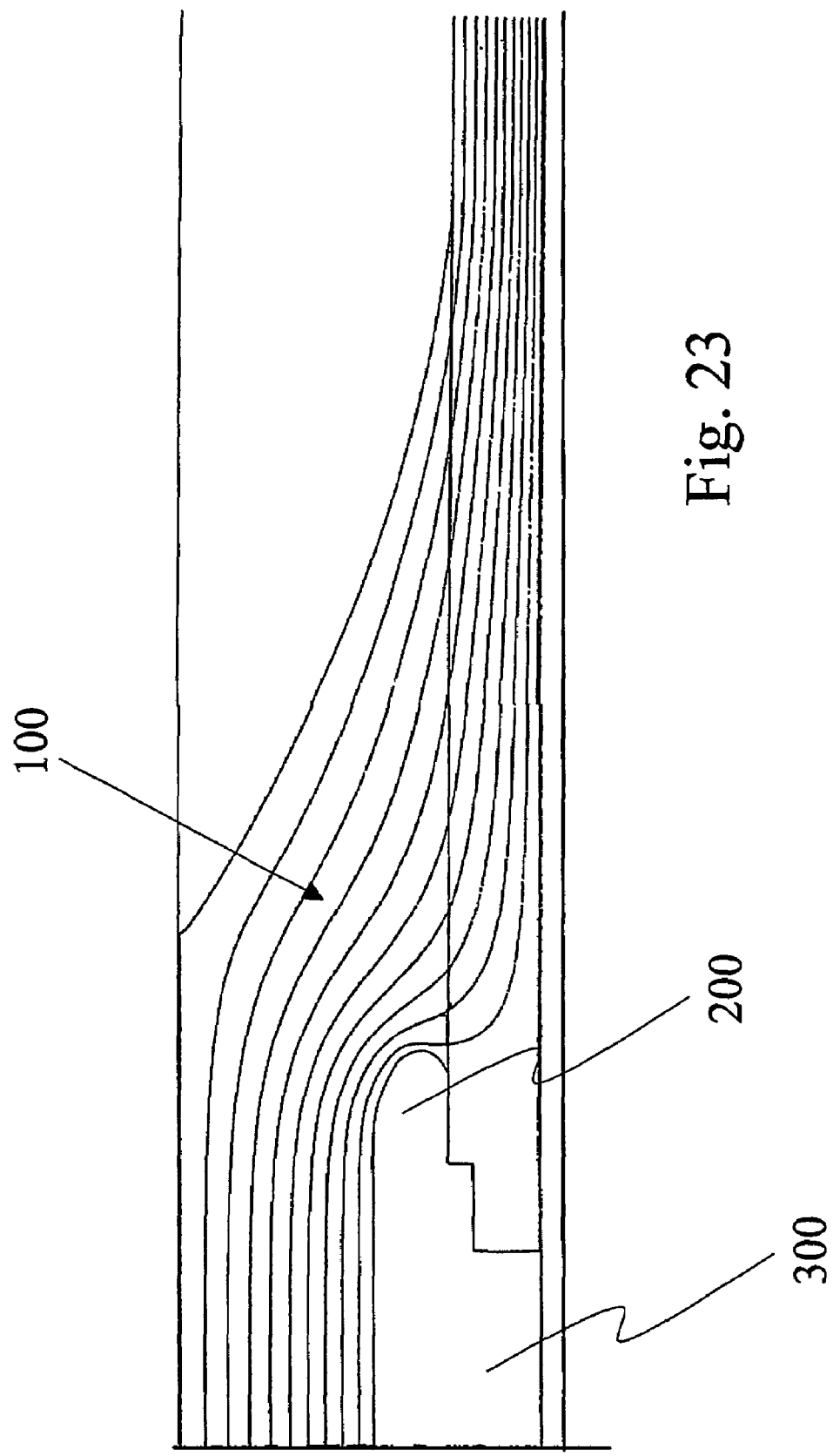

FIG. 22 shows an elastomeric sleeve and, in particular, the geometrical shape of the space comprised among the supporting element, the mould walls, the walls of the electrode and of the stress control screens, i.e. the shape of the insulating element of the elastomeric sleeve to be obtained.

The insulating element is divided into a plurality of cross sections, each cross section being located at a predetermined distance $x_i$ calculated from the feeding point of the insulating material, i.e. from the height $x_0$ of the slit 37 of the channel 34.

In more details, said cross sections identify a plurality of volumes of the insulating element to be filled with the insulating material. Table 1 hereinbelow identifies the position of each cross section (indicated as $x_i$) with respect to $x_0$.

With reference to FIG. 22, the internal diameter of the mould was 60 mm and the free volume to be filled, i.e. the volume of the insulating element, was 4,683 $dm^3$.

The step of filling the mould was carried out according to the first embodiment of the present invention (as disclosed with reference to FIGS. 2 to 4) and by using a constant flow of the insulating material fed into the mould.

The annular channel 34 was fed by a single-screw extruder (L/D=10; D=90 mm; screw rotation speed=10 rpm). The rate of flow of the extruder was set to be constant at the value of 0.611 $dm^3$/min.

Table 1 shows the volumes to be filled in relation with each cross section. In more details, the volumetric value corresponding to a given cross section is the volume to be filled which is comprised between that cross section and the previous one. For instance, the value of 1,169 $dm^3$ corresponding to cross section $S_1$ indicates the volume comprised between $S_1$ and $S_0$.

Furthermore, Table 1 shows the speeds of the supporting element 30 while advancing into the mould. In more details, the speed value corresponding to a given cross section is the advancing speed of the supporting element which is imparted thereto for filling the volume comprised between that cross section and the previous one. For instance, the value of 26,30 mm/min corresponding to cross section $S_1$ indicates the speed which, at the constant rate of flow of 0.611 $dm^3$/min, has to be imparted to the supporting element for filling the volume comprised between $S_1$ and $S_0$.

It can be noted that, in correspondence of the cross sections $S_1$ and $S_3$, the speed of the supporting element is remarkably low in respect of the speed value at $S_2$. This is due to the fact that, when the supporting element being introduced into the mould causes the cross section $S_0$ to face the slit 37, at that time instant the insulating material is able to access the frusto-conical zone defined under the cup-shaped stress control screen of the elastomeric sleeve. In fact, it has to be noted that, previously to that time instant, the insulating material is prevented from filling the frusto-conical zone of the insulating element (i.e. the frusto-conical zone under the cup-shaped stress control screen) because of the presence of the stress control screen which physically obstructs the slit 37.

Furthermore, according to further service conditions, at a given time instant of the advancing of the supporting element, the latter can be even stopped (therefore the speed is equal to zero) in order to allow the insulating material to fill zones of the mould which are inaccessible previously to that time instant.

TABLE 1

| Cross section | Distance ($x_i$) of each cross section ($S_i$) from $x_0$ (mm) | Volume (dm$^3$) | Speed (mm/min) |
| --- | --- | --- | --- |
| $S_1$ | 50.44 | 1.169 | 26.30 |
| $S_2$ | 300.44 | 2.344 | 65.27 |
| $S_3$ | 350.88 | 1.169 | 26.30 |

EXAMPLE 2

Invention

With reference to FIG. 22 of Example 1, the step of filling the mould was carried out according to the first embodiment of the present invention (as disclosed with reference to FIGS. 2 to 4) and by using a constant speed of the supporting element entering the mould.

The speed of the supporting element was set to be constant at a value of 45 mm/min.

The annular channel 34 was fed by a single-screw extruder (L/D=10; D=90 mm).

Analogously to Table 1, Table 2 shows the volumes to be filled in relation with each cross section.

Furthermore, Table 2 shows the rates of flow of the extruder which is set up for a given cross section, during the advancing of the supporting element into the mould, for filling the volume comprised between that cross section and the previous one. For instance, the value of 1.04 dm$^3$/min corresponding to cross section $S_1$ indicates, at the constant speed of 45 mm/min, the rate of flow of the extruder which is necessary for filling the volume comprised between $S_1$ and $S_0$.

TABLE 2

| Cross section | Distance ($x_i$) of each cross section ($S_i$) from $x_0$ (mm) | Volume (dm$^3$) | Rate of flow of the extruder (dm$^3$/min) |
| --- | --- | --- | --- |
| $S_1$ | 50.44 | 1.169 | 1.04 |
| $S_2$ | 300.44 | 2.344 | 2.34 |
| $S_3$ | 350.88 | 1.169 | 1.04 |

The invention claimed is:

1. A process for manufacturing an elastomeric sleeve of a joint for electrical cables, said sleeve comprising:
    an electric field-control element;
    an electrical insulating element surrounding said electric field-control element; and
    at least two stress control screens positioned at the axial ends of said electrical insulating element,
said process comprising the steps of:
    introducing said electric field control element and said stress control screens into a mould provided for moulding said electrical insulating element made of an electrical insulating material;
    prior to introducing said electric field control element and said stress control screens into said mould, providing said electric field control element and said stress control screens on a supporting element;
    filling with said electrical insulating material the space radially external to said electric field-control element and the space between said electric field-control element and said stress control screens, the step of filling being carried out during the step of introducing; and
    curing said electrical insulating material to obtain said electrical insulating element of said elastomeric sleeve.

2. The process according to claim 1, wherein the step of introducing is carried out by coaxially moving said supporting element into said mould.

3. The process according to claim 1, wherein the step of introducing is carried out by moving said supporting element in a substantially vertical direction.

4. The process according to claim 1, wherein the step of filling comprises the step of extruding said electrical insulating material.

5. The process according to claim 1, wherein said insulating material is filled into said mould according to a first direction and said supporting element is introduced into said mould according to a second direction, said second direction being substantially perpendicular to said first direction.

6. The process according to claim 5, wherein said second direction is a substantially vertical direction.

7. The process according to claim 1, wherein a path of filling said insulating material into said mould corresponds to a path of introduction of said supporting element into said mould.

8. The process according to claim 7, wherein a direction of filling of said insulating material into said mould corresponds to a direction of introduction of said supporting element into said mould.

9. The process according to claim 7, wherein a direction of filling of said insulating material into said mould is opposite to a direction of introduction of said supporting element into said mould.

10. The process according to claim 1, wherein the step of filling comprises the step of distributing said insulating material over the transverse cross section of said mould.

11. The process according to claim 1, further comprising the step of correlating the step of filling with the volume of the space to be filled with said insulating material.

12. The process according to claim 11, wherein the step of correlating comprises the step of varying the advancing speed of said supporting element into said mould with respect to said volume.

13. The process according to claim 12, wherein the step of correlating comprises the step of maintaining substantially constant the flow rate of said insulating material being fed into said mould.

14. The process according to claim 11, wherein the step of correlating comprises the step of varying the flow rate of said insulating material with respect to said volume.

15. The process according to claim 14, wherein the step of correlating comprises the step of maintaining substantially constant the advancing speed of said supporting element into said mould.

16. The process according to claim 1, wherein the step of curing comprises the step of providing a heat amount for crosslinking said insulating material.

17. The process according to claim 1, further comprising the step of cooling said insulating material after said step of curing.

18. The process according to claim 1, further comprising the step of removing from said mould said elastomeric sleeve supported on said supporting element.

19. The process according to claim 1, further comprising the step of releasing said elastomeric sleeve from said supporting element.

* * * * *

UNITED STATES PATENT AND TRADEMARK OFFICE
CERTIFICATE OF CORRECTION

PATENT NO. : 7,645,408 B2  Page 1 of 1
APPLICATION NO. : 10/532537
DATED : January 12, 2010
INVENTOR(S) : Vallauri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 858 days.

Signed and Sealed this

Twenty-first Day of December, 2010

David J. Kappos
*Director of the United States Patent and Trademark Office*